(12) United States Patent
Otsuka et al.

(10) Patent No.: US 7,382,295 B2
(45) Date of Patent: Jun. 3, 2008

(54) CONTROL UNIT FOR ELECTRIC POWER STEERING APPARATUS

(75) Inventors: Tetsuro Otsuka, Gunma (JP); Atsushi Horikoshi, Kanagawa (JP); Yuho Aoki, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 0 days.

(21) Appl. No.: 10/578,267

(22) PCT Filed: Nov. 1, 2004

(86) PCT No.: PCT/JP2004/016502

§ 371 (c)(1),
(2), (4) Date: May 4, 2006

(87) PCT Pub. No.: WO2005/043089

PCT Pub. Date: May 12, 2005

(65) Prior Publication Data

US 2007/0146169 A1 Jun. 28, 2007

(30) Foreign Application Priority Data

Nov. 4, 2003 (JP) ............................. 2003-374341
Dec. 4, 2003 (JP) ............................. 2003-406321

(51) Int. Cl.
*H03M 1/48* (2006.01)

(52) U.S. Cl. ...................... 341/116; 341/111; 341/112; 341/115; 324/207.25; 318/605; 318/608; 318/611; 250/231.13; 250/231.16; 702/151

(58) Field of Classification Search ......... 341/115–116
See application file for complete search history.

(56) References Cited

U.S. PATENT DOCUMENTS

| | | | | |
|---|---|---|---|---|
| 6,191,550 B1* | 2/2001 | Yoshihara | .................... | 318/661 |
| 6,522,097 B2* | 2/2003 | Fujimoto et al. | ........... | 318/605 |
| 6,577,957 B2* | 6/2003 | Fujimoto et al. | ............. | 702/36 |
| 6,615,152 B2* | 9/2003 | Fujimoto et al. | ............. | 702/94 |
| 6,885,927 B2* | 4/2005 | Arimura | ...................... | 701/41 |
| 7,012,399 B2* | 3/2006 | Suzuki | ........................ | 318/661 |

FOREIGN PATENT DOCUMENTS

| | | |
|---|---|---|
| JP | 63-155016 U | 10/1988 |
| JP | 4-191615 A | 7/1992 |
| JP | 5-322598 A | 12/1993 |

(Continued)

*Primary Examiner*—Khai M Nguyen
(74) *Attorney, Agent, or Firm*—Sughrue Mion, PLLC

(57) ABSTRACT

Since an abnormality is judged by executing a square calculating process with respect to sin θ and cos θ for detecting an abnormality in an angular resolver, a processing time is elongated, and a burden to a CPU is great. Since the invention prepares a map which can judge whether the combination of sin θ and cos θ is normal or abnormal, and judges by mapping the combination of the detected sin θ and cos θ, a process can be easily executed, a processing speed is high, and a burden to the CPU can be reduced. Further, an assist can be maintained by controlling a motor by a rectangular wave current by detecting a rotation angle signal at low resolution level, such as Hall sensors arranged around the motor.

7 Claims, 17 Drawing Sheets

FOREIGN PATENT DOCUMENTS

| | | |
|---|---|---|
| JP | 9-72758 A | 3/1997 |
| JP | 3136937 B2 | 2/2001 |
| JP | 2002-5690 A | 1/2002 |
| JP | 2003-26020 A | 1/2003 |
| JP | 2003-166803 A | 6/2003 |

* cited by examiner

FIG.9

| sin θ \ cos θ | NO MORE THAN −a | −a~−b | −a~a | a~b | NO LESS THAN b |
|---|---|---|---|---|---|
| NO MORE THAN −a | ABNORMAL | ABNORMAL | ABNORMAL | ABNORMAL | ABNORMAL |
| −a~−b | ABNORMAL | NORMAL | NORMAL | NORMAL | ABNORMAL |
| −a~a | ABNORMAL | NORMAL | ABNORMAL | NORMAL | ABNORMAL |
| −a~a | ABNORMAL | NORMAL | ABNORMAL | NORMAL | ABNORMAL |
| a~b | ABNORMAL | NORMAL | NORMAL | NORMAL | ABNORMAL |
| NO LESS THAN b | ABNORMAL | ABNORMAL | ABNORMAL | ABNORMAL | ABNORMAL |

CONTROL UNIT FOR ELECTRIC POWER STEERING APPARATUS

TECHNICAL FIELD

The present invention relates to a control unit for electric power steering apparatus, and more particularly to a control unit for electric power steering apparatus which is provided with an abnormality detecting function of an angle detecting device of a motor used in the electric power steering apparatus, and takes into consideration a protecting operation with respect to a failure of the angle detecting device.

BACKGROUND ART

An electric power steering apparatus for applying a steering assist force to a steering mechanism of an automobile by a rotating force of a motor transmits a driving force of the motor by a transmitting mechanism such as a gear or a belt through a reduction gear to apply the steering assist force to a steering shaft or a rack shaft. An example of a brief structure of such an electric power steering apparatus is shown in FIG. 1 and will be described.

A shaft 102 of a steering wheel 101 is coupled to tie rods 106 of steered wheels through a reduction gear 103, universal joints 104a and 104b, and a pinion rack mechanism 105. The shaft 102 is provided with a torque sensor 107 for detecting steering torque of the steering wheel 101, and a motor 108 for assisting a steering force of the steering wheel 101 is coupled to the shaft 102 through the reduction gear 103.

It is very important to detect a rotation angle θ of the motor for controlling the motor 108 of the electric power steering apparatus mentioned above, and in the case that any abnormality is generated in the angle detection, it is necessary to immediately detect the abnormality and take a proper safety measure. Accordingly, various detecting methods and detecting apparatuses have been conventionally developed in connection with the abnormality detection.

For example, Japanese Patent No. 3136937 discloses a detection abnormality of an angular resolver corresponding to one of the angle detecting device, and contents thereof will be explained with reference to FIG. 2.

An apparatus for detecting an angle is constituted by an angular resolver 10, and an angle detecting process portion for calculating a rotation angle θ by processing a signal output from the angular resolver 10. As one example of the angle detecting process portion, a resolver digital conversion (RDC) circuit 14 is provided. Further, a subject to be detected the abnormality is constituted by the angular resolver 10 except the resolver digital conversion circuit 14, a wiring to the angular resolver 10 or the like, and a detecting method is generally executed by detecting an abnormality of the angular resolver 10 by detecting an abnormality of a sin signal (=sin ωt·sin θ) and a cos signal (=sin ωt·cos θ) corresponding to the output signal of the angular resolver 10.

In this case, the resolver digital conversion circuit 14 has a structure provided with a function of detecting the abnormality of the angular resolver 10, and an abnormality detecting signal is output from an E terminal of the resolver digital conversion circuit 14 in FIG. 2. However, since the performance of detecting the abnormality is definite and is not sufficient, there is a case that a unique abnormality detecting circuit explained below is provided.

In FIG. 2, a carrier wave oscillation circuit 12 sends a carrier wave signal sin ωt to the angular resolver 10 for detecting a rotation angle θ of a motor 108, whereby a sin signal (sin ωt·sin θ) and a cos signal (sin ωt·cos θ) corresponding to the rotation angle θ are output from the angular resolver 10. The rotation angle θ is calculated in the resolver digital conversion circuit 14 to which the sin signal and the cos signal are input, the calculated rotation angle θ is incorporated into a CPU circuit 16, and the motor 108 is controlled on the basis of the rotation angle θ.

A description will be given of a state in which the abnormality of the resolver 10 or the like is detected by using the sin signal and the cos signal with reference to a flow chart in FIG. 3.

As a method of calculating the sin θ from the sin signal, a peak value of the sin signal is held by sampling the sin signal in synchronous with the peak of the carrier wave sin ωt, and it is possible to detect the sin angle signal (sin θ) corresponding to an envelope curve of the sin signal. In the same manner, it is possible to calculate the cos angle signal (cos θ) from the cos signal. A relation between the sin ωt, the sin θ and the cos θ is illustrated as FIG. 4. Specifically describing the process mentioned above, in order to detect the peak of the carrier wave sin ωt output from the carrier wave oscillation circuit 12, in FIG. 2, a peak value setting circuit 24 indicating a reference amplitude corresponding to the peak value of the sin ωt and the carrier wave signal sin ωt are compared by a comparator circuit 22, and the peak time is detected. It is possible to detect the sin angle signal (sin θ) and the cos angle signal (cos θ) by latching the sin signal and the cos signal in an AD converter 44 and an AD converter 46 serving as a sample hold in synchronous with the peak time.

The sin angle signal (sin θ) and the cos angle signal (cos θ) detected as mentioned above are incorporated into a CPU circuit (an arithmetic processing circuit mainly constituted by a CPU or an MPU), and a process of a flow chart shown in FIG. 3 is executed. In other words, first, the sin angle signal (sin θ) and the cos angle signal (cos θ) are incorporated into the CPU circuit 16 (a step S301), and the CPU circuit 16 executes a calculation of $(\sin \theta)^2 + (\cos \theta)^2 = P$ (a step S302), and judges normal or abnormal on the basis of whether a value of P exists in a range $0.9 < P < 1.1$ (a step S303).

In Japanese Patent No. 3216491, an abnormality is detected by executing a calculation of $(\sin \theta)^2 + (\cos \theta)^2 = P$ and judging whether or not P=1 is established (a step S303).

However, whichever method is executed, it is necessary to execute an AD conversion of the sin signal and the cos signal in synchronous with the carrier wave, an interruption by a carrier wave peak timing, a calculation of $(\sin \theta)^2 + (\cos \theta)^2$ and the like, and the calculation requires a lot of processing time. Further, in the case of processing by a software, there is a problem the process is a burden to the CPU, and in the case of processing by a hardware, there is a problem that a lot of hardwares are necessary.

The present invention is made on the basis of the circumstances as mentioned above, an object of the present invention is to provide a control unit for electric power steering apparatus which can detect an abnormality of an angle detecting device of a motor used in the control unit of the electric power steering apparatus, an abnormality of an incomplete disconnection state (a rare short) and the like rapidly, without being a burden to a CPU and without having need of addition of a lot of hardwares.

On the other hand, in the electric power steering apparatus, it is necessary to correctly execute a motor control in such a manner as to output a desired torque in correspondence to a handle operation of a driver. Further, in order to correctly control the motor, it is necessary to detect a state of the electric power steering apparatus by utilizing various sensors. Since a detected signal obtained from the sensor is very important for controlling the electric power steenng apparatus, it is necessary to quickly detect a failure of the sensor so as to execute a control and a protection in correspondence thereto. For example, the control after detecting the failure of the motor angle detecting device corresponding to one of the sensors is a very important problem for a safety steering of the vehicle, and various control unit have been conventionally considered.

As one example, a description will be given of a control unit in Japanese Patent Application Publication No. 2003-26020 with reference to FIG. 5.

In FIG. 5, a vehicle speed V detected by a vehicle speed sensor 313 and a torque value Tr detected by a torque sensor 107 are input to a torque command value calculating portion 319, and a torque command value Tref is calculated in the torque command value calculating portion 319. Next, the torque command value Tref and a rotation angle θ of a motor 108 output by a resolver digital conversion circuit 311 are input to a current command value calculating means 320, and current command values Idref and Iqref are calculated. On the other hand, if the motor 108 is excited, motor current Ia, Ib and Ic are detected by a current detecting device 312, and the motor currents Ia, Ib and Ic are converted into two-phase currents Id and Iq of d-q axis by a three-phase/two-phase conversion portion 327.

In a subtracting means 321, deviations ΔId and ΔIq between the current command values Idref and Iqref, and the motor currents Id and Iq are calculated. Each of the calculated deviations ΔId and ΔIq is input to a PI control portion 323, voltage command values Vdref and Vqref are calculated in such a manner that the deviation ΔI becomes zero, and the voltage command values Vdref and Vqref are converted into three-phase voltage command values Varef, Vbref and Vcref in a two-phase/three-phase converting means 324. A PWM control portion 325 drives an inverter circuit 326 constituted by FETs on the basis of the three-phase voltage command values Varef, Vbref and Vcref, and supplies the motor current Ia, Ib and Ic to the motor 108. Further, the rotation angle θ of the motor 108 is detected by a resolver 310 corresponding to one example of the angle detecting device and a position detection circuit 311 corresponding to an angle detecting means (the rotation angle θ of the motor 108 is detected mainly by a resolver digital conversion circuit (an RDC circuit), and the rotation angle θ is utilized in the two-phase/three-phase conversion portion 324, the three-phase/two-phase conversion portion 327 and the like.

In the control of the electric power steering apparatus mentioned above, in the case that the detection of the resolver 310 and the resolver digital conversion circuit 311 becomes abnormal, it is impossible to correctly detect the rotation angle θ, and the correct control can not be executed. Accordingly, there is executed the control of stopping the electric power steering apparatus, and changing a handle operation to a manual operated state.

However, if an assist of the handle operation by the electric power steering apparatus is lost, and the operation is changed suddenly to the manual operation, a great uncomfortable feeling is applied to the handle operation. Accordingly, this matter is not preferable. Therefore, in Japanese Patent Application Laid-Open No. 2003-26020, an abnormality judging means 340 is provided. When detecting any abnormality of the resolver 310 or the resolver digital conversion circuit 311, a counter torque against a wish of the handle operation is not generated in some position of the rotation angle θ. Accordingly, there is executed a process of continuing the assist by the electric power steering apparatus for a short time. However, there is a case that it is necessary to immediately stop the electric power steering apparatus in the other position of the rotation angle θ so as to change the handle to the manual operation.

As mentioned above, in the control in the case of detecting the abnormality of the rotation angle θ, there is a problem that the control or the electric power steering apparatus can not be continued in accordance with the position of the rotation angle θ at a time of detecting the abnormality, and the duration is widely limited. Further, the load applied to the driver undesirably becomes greater in the manual operation in correspondence to the increase in size of the vehicle mounting the electric power steering apparatus thereon in recent years.

The present invention is made on the basis of the circumstance as mentioned above, and an object of the present invention is to provide a control unit for electric power steering apparatus which can continue a control of a electric power steering apparatus regardless of a position of a rotation angle θ at a time of failure, even in the case that an angle detecting device for detecting the rotation angle θ of the motor of the electric power steering apparatus is out of order.

DISCLOSURE OF THE INVENTION

The present invention relates to a control unit for electric power steering apparatus provided with an angle detecting device which supplies a carrier signal (sin ωt) constituted by a predetermined frequency and generates a sin signal (sin ωt·sin θ) having a wave shape obtained by modulating an amplitude of the carrier wave signal by sin θ and a cos signal (sin ωt·cos θ) having a wave shape obtained by modulating the amplitude by cos θ, for detecting a rotation angle θ of the motor necessary for the control for applying a steering assist force by the motor to a steering system of a vehicle, and the object mentioned above of the present invention can be achieved by being provided with an abnormal region judging map constituted by two values comprising a value corresponding to the sin θ and a value corresponding to the cos θ and constituted by a normal region and an abnormal region, and judging an abnormality of the angle detecting device by mapping the sin θ and the cos θ respectively calculated from the sin signal and the cos signal to the abnormal region judging map.

Further, the object mentioned above of the present invention can be achieved by a structure in which the abnormal region judging map sets the value corresponding to the sin θ to a value in an x-coordinate and sets the value corresponding to the cos θ to a value in a Y-coordinate, and a region surrounded by a quadrangle α structured on a region constituted by an X-axis and a Y-axis orthogonal to each other around an origin in which both of the values in the X-coordinate and the Y-coordinate are zero, and a quadrangle β smaller than the quadrangle α constituted around the origin forms a normal region.

Further, the object mentioned above of the present invention can be achieved by detecting the sin θ and the cos θ in synchronous with the carrier wave signal or at an integral multiple of cycle of the cycle of the carrier wave.

The object mentioned above of the present invention can be achieved by being provided with an angle detecting process circuit detecting an abnormality of the angle detecting device from the carrier wave signal, the sin signal and the cos signal and the abnormal region judging map, and doubly monitoring the abnormality of the angle detecting device by the angle detecting process circuit and the abnormal region judging map.

The present invention relates to a control unit for electric power steering apparatus provided with an angle detecting device which supplies a carrier wave signal (sin ωt) constituted by a predetermined frequency and generates a sin signal (sin ωt·sin θ) having a wave shape obtained by modulating an amplitude of the carrier wave signal by sin θ and a cos signal (sin ωt·cos θ) having a wave shape obtained by modulating the amplitude by cos θ, for detecting a rotation angle θ of the motor necessary for the control for applying a steering assist force by the motor to a steering system of a vehicle, and the object mentioned above of the present invention can be achieved by being provided with an angle processing means respectively detecting the sin angle signal (sin θ) and the cos angle signal (cos θ) from the sin signal and the cos signal, and outputting a rotation angle signal formed by a signal formed by the cos angle signal and a signal formed by the sin angle signal, and the motor being controlled on the basis of the rotation angle signal. Further, the object mentioned above of the present invention can be achieved by a structure in which the motor is constituted by a three-phase brushless motor, the signal formed by the cos angle signal is constituted by a one-bit signal displaying positive or negative of the value of the cos angle signal, and the signal formed by the sin angle signal is constituted by two one-bit signals displaying respective results obtained by judging a size by two threshold values judging a level of the value of the sin angle signal.

Further, the object mentioned above of the present invention can be achieved by respectively detecting the sin angle signal and the cos angle signal in synchronous with the carrier wave signal or at an integral multiple of cycle of the cycle of the carrier wave from the sin signal and the cos signal.

The object mentioned above of the present invention can be achieved by being provided with an auxiliary angle processing means constituted by the angle processing means, and a main angle processing means for detecting the rotation angle θ, and controlling the motor on the basis of the rotation angle signal output by the auxiliary angle processing means in place of the rotation angle θ detected by the main angle processing means in the case that the main angle processing means is out of order.

Further, the object mentioned above of the present invention can be achieved by a structure in which a current applied to the motor is constituted by a sine-wave current in the case of being controlled on the basis of the rotation angle θ, and a current applied to the motor is constituted by a rectangular current in the case of being controlled on the basis of the rotation angle signal.

BRIEF DESCRIPTION OF THE DRAWINGS

FIG. 9 is a view showing an example which specifies the abnormal region judging map by a software;

BEST MODE FOR CARRYING OUT THE INVENTION

A basic idea of the present invention is constituted by a value corresponding to a sin θ and a value corresponding to a cos θ, prepares an abnormal region judging map constituted by a normal region and an abnormal region, detects an angle information sin θ and cos θ on the basis of an angle information sin ωt·sin θ and sin ωt·cos θ corresponding to an information obtained from an angle detecting device such as an angular resolver or the like, and judges abnormal or normal by mapping them on the abnormal region judging map as they are without calculating them.

Figure 6:
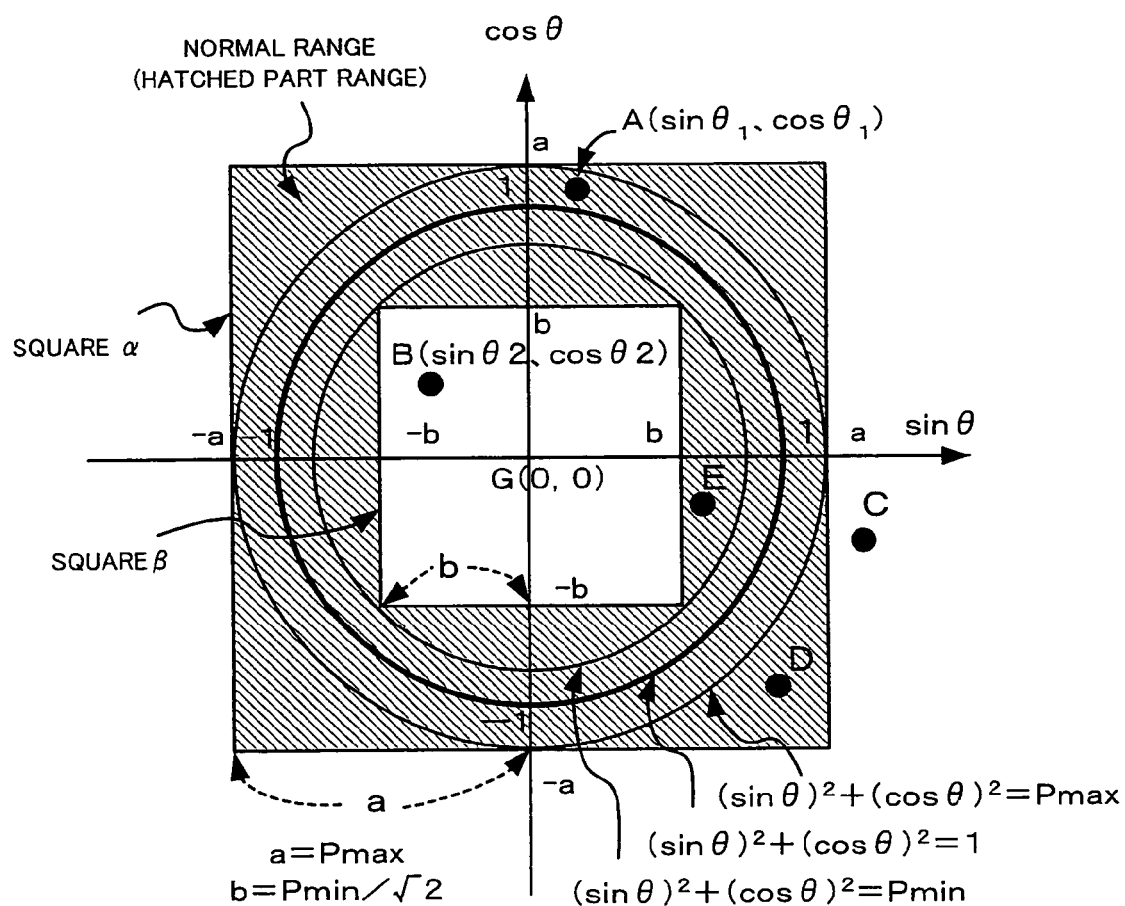
FIG. 6 is a view showing a basic concept of an abnormal region judging map in accordance with the present invention.

A description will be first given of an abnormal region judging map which is most important for the present invention with reference to FIG. 6. The abnormal region judging map is constituted by a sin θ and a cos θ, and is structured by respectively parallelizing sin θ and cos θ to an X-axis and a Y-axis in FIG. 6. Three coaxial circles and two quadrangles are displayed around an origin G (0, 0) in the abnormal region judging map.

A description will be given first of three coaxial circles. An innermost coaxial circle displays a circle of $(\sin θ)^2+(\cos θ)^2=Pmin$, a middle coaxial circle displays a circle of $(\sin θ)^2+(\cos θ)^2=1$, and an outermost coaxial circle displays a circle of $(\sin θ)^2+(\cos θ)^2=Pmax$, respectively. A large quadrangle α corresponds to a square in which one line is 2×Pmax, and a small quadrangle β corresponds to a quadrangle in which one line is $2\times(Pmin/\sqrt{2})$. In this case, a normal region shows a hatched part region surrounded by the large quadrangle α and the small quadrangle β, and the other region shows an abnormal region. In this case, the judging standard Pmin or Pmax mentioned above is structured such that it is possible to adjust an abnormality detecting precision by the Pmax and Pmin while taking into consideration a precision of detection, a number of poles of the motor or the like. It is possible to detect an abnormality in the detecting precision of the resolver due to a failure during the driving of the motor and an aged deterioration, by suitably setting the Pmax and Pmin.

In this case, $(\sin \theta)^2+(\cos \theta)^2=1$ corresponds to the normality judging standard used in the prior art, and $(\sin \theta)^2+(\cos \theta)^2=0.9$ and $1.1$ is provided for indicating the normal region of $0.9<(\sin \theta)^2+(\cos \theta)^2<1.1$. Accordingly, it is known that a range (a hatched part region) regarded as the normal region in the present invention is wider than the conventional normal range.

The normal region is constituted by a wide region because the present invention does not execute the calculation $(\sin \theta)^2+(\cos \theta)^2$. In the conventional abnormality judgment, the judgment is executed whether the result obtained by executing the calculation $(\sin \theta)^2+(\cos \theta)^2$ satisfies $(\sin \theta)^2+(\cos \theta)^2=1$ or $0.9<(\sin \theta)^2+(\cos \theta)^2<1.1$. The problem of this process exists in the matter that the calculation of $(\sin \theta)^2+(\cos \theta)^2$ is a burden to the CPU in the case that the calculation is processed by the software, a processing time is necessary, and it is impossible to process at a high speed. In the case of processing by the hardware, the hardware for these processes is necessary, and there is a problem that a number of the parts is increased. However, in accordance with the present invention, the structure is made such that whether normal or abnormal is judged by combining $\sin \theta$ and $\cos \theta$ obtained from $\sin \omega t \cdot \sin \theta$ and $\sin \omega t \cdot \cos \theta$ as they are without executing the calculation of $(\sin \theta)^2+(\cos \theta)^2$, for example, mapping $(\sin \theta 1, \cos \theta 1)$ to the abnormal region judging map mentioned above as it is. As a result, it is possible to quicken the process for the judgment and it is possible to widely reduce the burden to the CPU for the process.

However, since the calculation of $(\sin \theta)^2+(\cos \theta)^2$ is not executed, there is generated a necessity of widening the judging region (the hatched part range) of the present invention in comparison with the conventional judging region. For example, in FIG. 6, in the case that the combination of $(\sin \theta, \cos \theta)$ is constituted by a point A, a point D or a point E, it is judged to be normal, and in the case that it is constituted by a point B or a point C, it is judged to be abnormal. Since the point A is normal in accordance with the conventional judging standard, and the point B and the point C are abnormal in accordance with the conventional judging standard, the result of judgment is not changed. However, the point D and the point E are abnormal in the conventional judging standard, however, is judged to be normal in the present invention. Since the calculation of $(\sin \theta)^2+(\cos \theta)^2$ has been executed conventionally, it is possible to judge whether or not the point D and the point E are abnormal, however, since the present invention maps the combination $(\sin \theta, \cos \theta)$ as it is, it is impossible to execute a strict judgment.

However, taking a practical point into consideration, it is necessary to strictly execute the judgment of the point D and the point E. In other words, the output of the angular resolver 10 becomes abnormal in most cases that a ground fault is generated in a circuit or a wiring of the angular resolver, and the combination $(\sin \theta, \cos \theta)$ caused thereby forms a locus reciprocating on the X-axis or the Y-axis, and does not stay on the point D or the point E for a long time. In other words, in order to judge the matter which is hardly generated actually, the process of $(\sin \theta)^2+(\cos \theta)^2$ has been conventionally executed. Further, even if the abnormality is constituted by an incomplete disconnection, the abnormality widely affecting the motion of the steering can be sufficiently detected in the judging region mentioned above. Accordingly, even if the matter which is hardly generated actually is not considered, no problem is generated practically. As a result, in accordance with the present invention, it is possible to obtain an effect that the processing speed becomes very high, and it is possible to widely reduce the burden to the CPU.

The description is given above of the abnormal region judging map which is most important for the present invention. A description will be given below of preferable embodiments in accordance with the present invention with reference to the accompanying drawings.

First Embodiment

A description will be given first of an embodiment in the case that the present invention is processed by a software.

Figure 7:
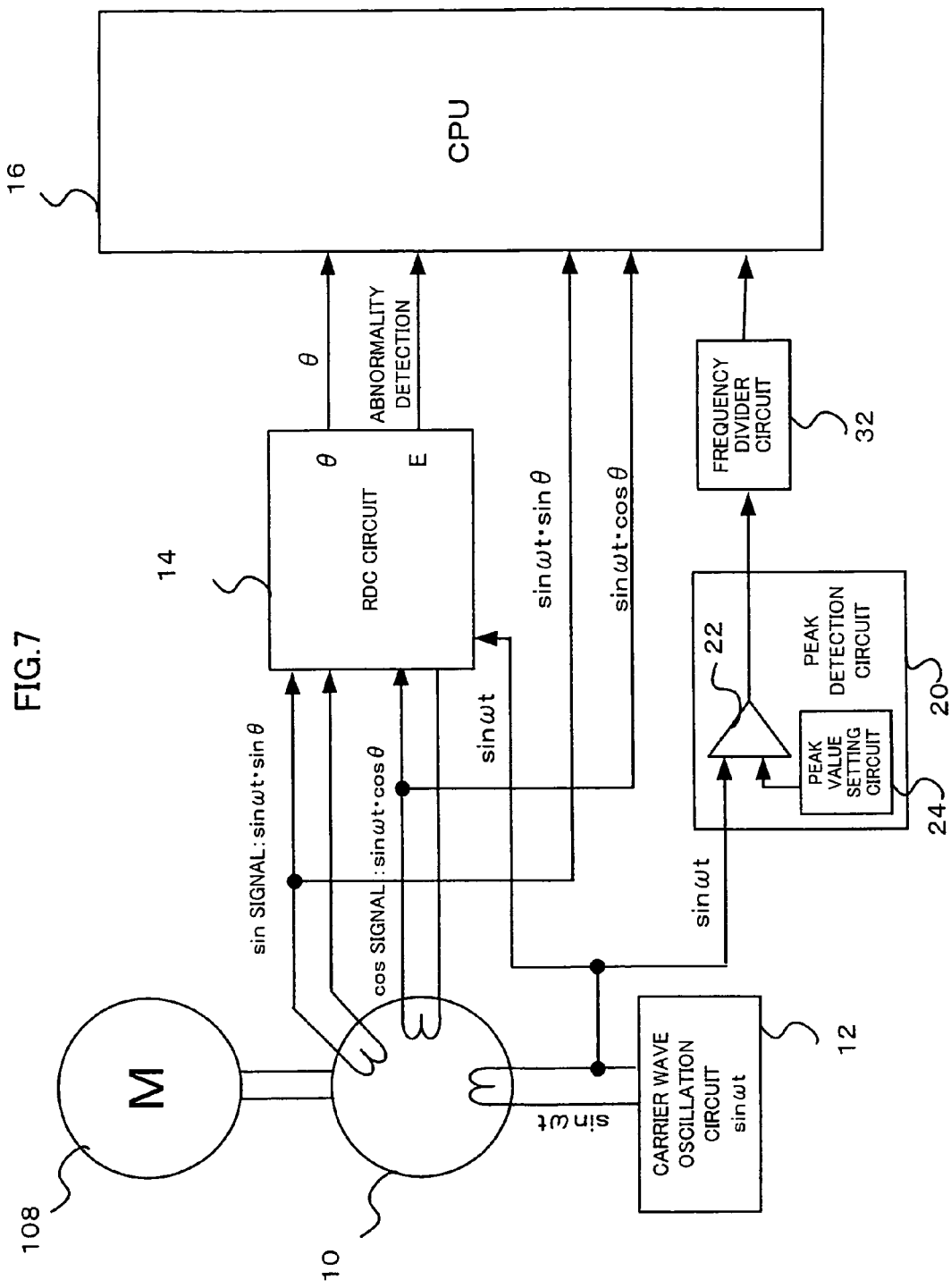
FIG. 7 is a block diagram showing a first embodiment in accordance with the present invention.

In FIG. 7, a sin signal ($\sin \omega t \cdot \sin \theta$) and a cos signal ($\sin \omega t \cdot \cos \theta$) output from an angular resolver 10 are input to a CPU circuit 16 via AD converter (not shown). In this case, a carrier wave signal $\sin \omega t$ output from a carrier wave oscillation circuit 12 is not directly input to the CPU circuit 16, but is input to a peak detection circuit 20 so as to detect a peak time of the carrier wave $\sin \omega t$. In specific, the carrier wave signal $\sin \omega t$ is input to the peak detection circuit 20, a peak value of the carrier wave signal $\sin \omega t$ shown by a peak value setting circuit 24 and the carrier wave are compared by a comparator circuit 22, and the peak time is detected on the basis of the compared result. A frequency divider circuit 32 arranged between the peak detection circuit 22 and the CPU circuit 16 inputs the peak time of the carrier wave to the CPU circuit 16 at a slow cycle which corresponds to an integral multiple of a cycle of the carrier wave $\sin \omega t$. In the case of inputting the peak time of the carrier wave to the CPU circuit 16 in synchronous with the cycle of the carrier wave, the frequency divider circuit 16 is not necessary. Further, the peak time may be set by detecting a zero cross time of the carrier wave $\sin \omega t$ and shifting at a time of $\pi/2$.

Figure 8:
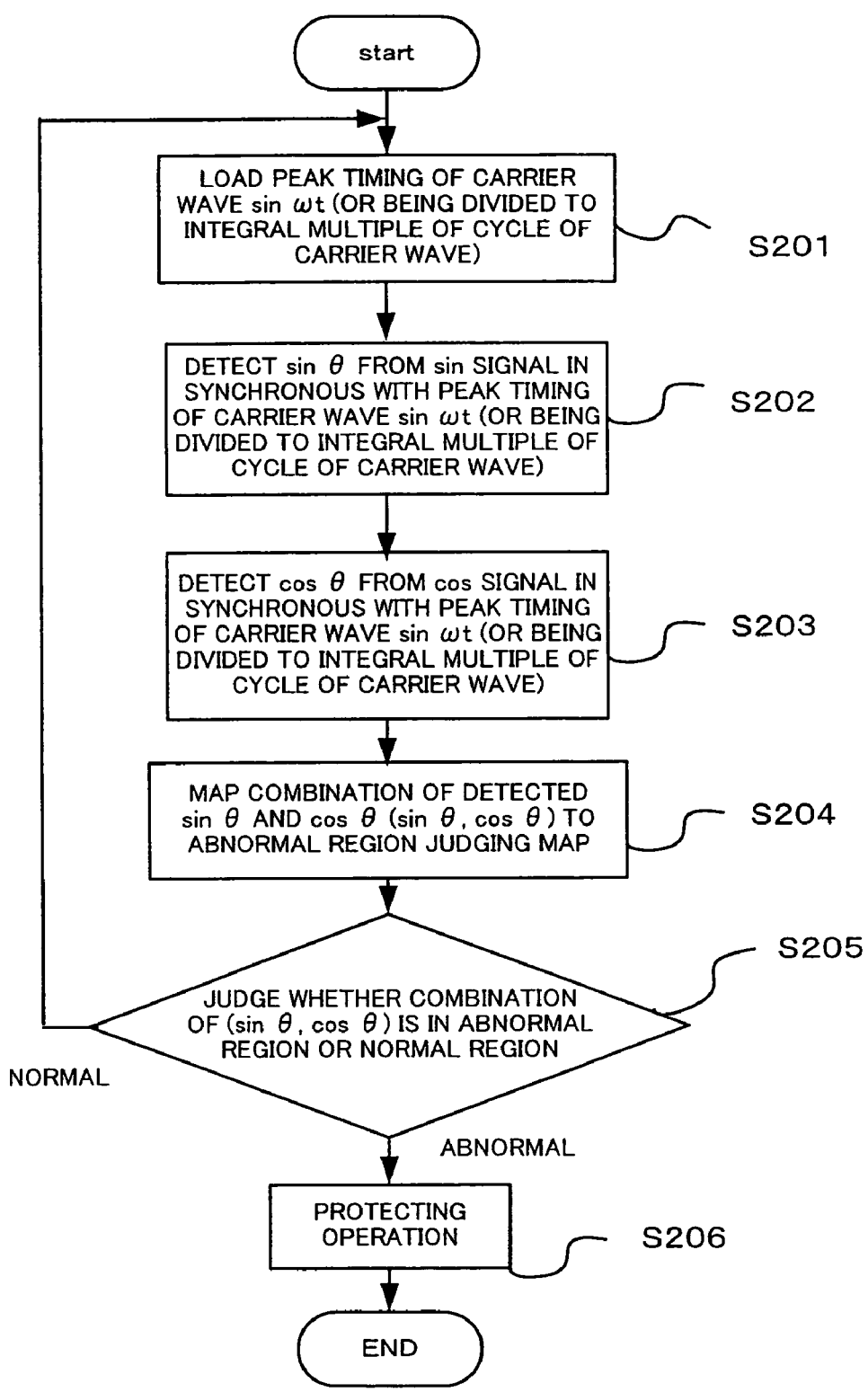
FIG. 8 is a flow chart showing an example of a software process of the first embodiment.

Next, a description will be given of a process within the CPU circuit 16 with reference to a flow chart in FIG. 8.

First, the CPU circuit 16 reads the peak time of the carrier wave signal $\sin \omega t$ or the peak time skipped to the integral multiple of the cycle of the carrier wave in the case of passing through the frequency divider circuit 32 (a step S201). The sin angle signal corresponding to $\sin \theta$ is detected from the sin signal ($\sin \omega t \cdot \sin \theta$) in synchronous with the peak of the carrier wave $\sin \omega t$ (a step S202). In the same manner, the cos angle signal corresponding to $\cos \theta$ is detected from the cos signal ($\sin \omega t \cdot \cos \theta$) in synchronous with the peak of the carrier wave $\sin \omega t$ (a step S203).

Next, the combination $(\sin \theta, \cos \theta)$ of the sin angle signal and the cos angle signal is mapped to the abnormal region judging map shown in FIG. 6 (a step S204), and it is judged whether the value of the combination is normal or abnormal (a step S205). For example, in the case that the sin angle signal and the cos angle signal are constituted by the combination $(\sin \theta 1, \cos \theta 1)$ of the point A in FIG. 6, it is judged to be normal. Further, in the case that the sin angle signal and the cos angle signal are constituted by the combination $(\sin \theta 2, \cos \theta 2)$ of the point B in FIG. 6, it is judged to be abnormal. Finally, in the case of being abnormal, any protecting operation is executed such as limiting an assist amount of the electric power steering apparatus or the like is executed (a step S206).

In this case, an example of the abnormal region judging map corresponding to FIG. 6 is shown in FIG. 9. A normal region (a hatched part) and an abnormal region shown in FIG. 9 are constructed by setting threshold values for judging the normal or abnormal of the value of the sin angle signal (sin θ) and cos angle signal (cos θ) as a table. In accordance with the structure mentioned above, it is possible to judge without using IF statement in the software.

As mentioned above, in the abnormality judgment in accordance with the present embodiment, since the normal or abnormal is judged on the basis of the combination of the sin angle signal and the cos angle signal, it is unnecessary to execute the conventional calculation of $(\sin θ)^2+(\cos θ)^2$. Accordingly, there can be obtained excellent effects that the processing speed is high, a CPU resource consumption for an interrupt processing and an AD conversion is reduced, and the burden to the CPU is reduced. Further, it the peak time of the carrier wave is read at the cycle which corresponds to the integral multiple of the cycle of the carrier wave by using the frequency divider circuit, the burden to the CPU can be further reduced.

Further, since it is possible to detect the abnormality in the angle detecting device by using the abnormal region judging map, it is possible to doubly monitor the abnormality in the angle detecting device or the like by using the abnormality detection included in the resolver digital conversion circuit 14. Accordingly, it is possible to further improve a reliability in comparison with the simple monitoring of the resolver digital conversion circuit.

Second Embodiment

Figure 10:
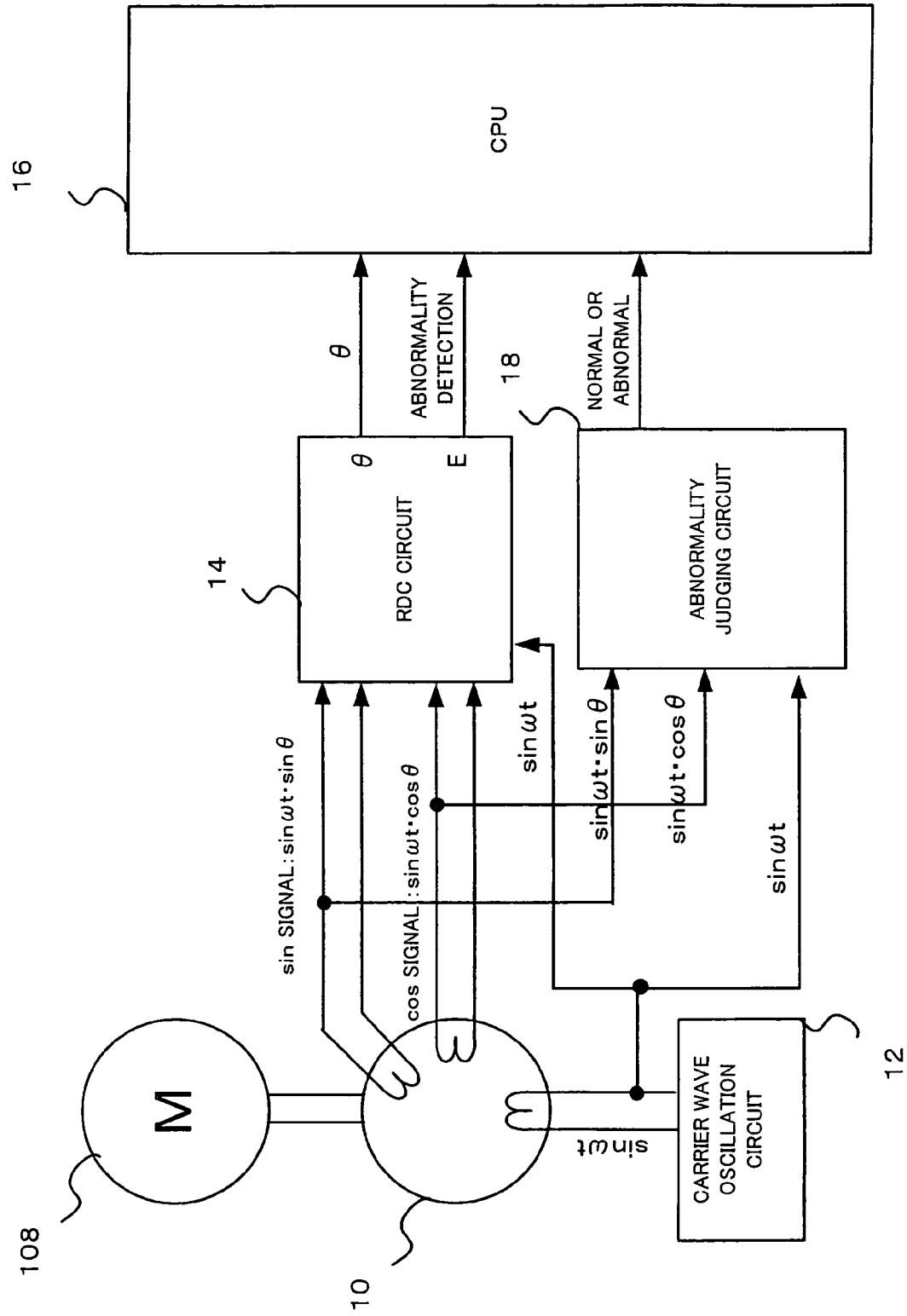
FIG. 10 is a block diagram showing a second embodiment in accordance with the present invention.
Figure 11:
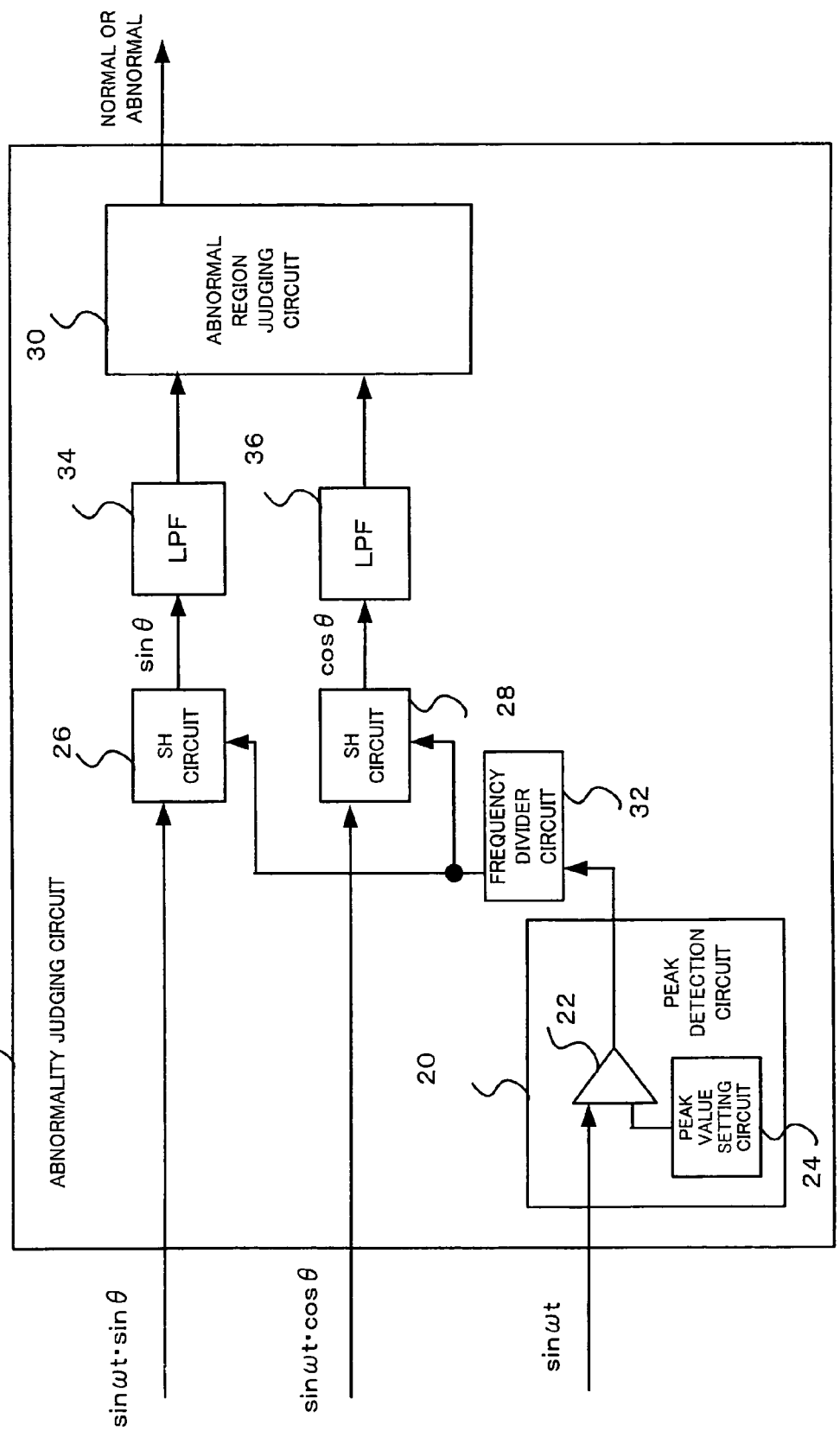
FIG. 11 is a block diagram showing an example of a detailed structure of an abnormality judging circuit in the second embodiment.

A description will be given of a second embodiment in accordance with the hardware process with reference to FIGS. 10 and 11. As shown in FIG. 10, an abnormality judging circuit 18 is arranged in a front stage to which the sin signal, the cos signal and the carrier wave signal are input to the CPU 16, and the result obtained by judging whether the sin signal and the cos signal are normal or abnormal is input to the CPU 16 after judging whether the sin signal and the cos signal are normal or abnormal.

A description will be given of a structure and an operation of the abnormality judging circuit 18 with reference to FIG. 11. The carrier wave signal sin ωt is input to the peak detection circuit 20, the peak value of the carrier wave signal sin ωt shown by the peak value setting circuit 24 and the carrier wave are compared in the comparator circuit 22, and the peak time is detected on the basis of the compared result. In FIG. 11, the frequency divider circuit 32 is connected to an output of the peak detection circuit 32, however, in the case that the frequency divider circuit 32 is not arranged, the sin angle signal (sin θ) is held from the sin signal in a sample hold circuit (hereinafter, refer to as "SH circuit") in synchronous with the detected peak time, and the cos angle signal (cos θ) is held from the cos signal in the SH circuit 28. A low-pass filter circuit (an LPF circuit) 34 and an LPF circuit 36 are respectively arranged in the outputs of the SH circuit 26 and the SH circuit 28, however, are provided for canceling a noise. In this case, a description will be given later of a case that the frequency divider circuit 32 is arranged in an output side of the peak detection circuit 32.

Next, the detected sin signal and cos signal are input to the abnormal region judging circuit 30 of the hardware structure corresponding to the abnormal region judging map, and it is determined whether normal or abnormal. The abnormal region judging circuit 30 can be structured by combining a comparator circuit comparing a voltage level or the like, and judges normal in the case that the combination (sin θ, cos θ) of the input sin angle signal and cos angle signal is constituted, for example, by the point A (sin θ1, cos θ1) in FIG. 6. Further, in the case that the sin angle signal and the cos angle signal are constituted by the combination (sin θ2, cos θ2) of the point B in FIG. 6, it judges abnormal. The output of the abnormal region judging circuit 30 showing the normal or the abnormal corresponds to the output of the abnormality judging circuit 18.

The present invention can be processed by the hardware as mentioned above, and it is possible to reduce the burden to the CPU circuit 16. In the present invention, it is not necessary to execute the conventional calculation of $(\sin θ)^2+(\cos θ)^2$, it is possible to structure only by the comparator circuit comparing the voltage level including the peak detection circuit 20, and the hardware structure is simple and the processing speed becomes high.

Next, a description will be given of a case that the frequency divider circuit 32 is arranged in an output side of the peak detection circuit 32 with reference to FIG. 11. It is unnecessary to frequently sample the sin angle signal and the cos angle signal in synchronous with the peak of the carrier wave signal, the effect of the present invention can be expected even by sampling while skipping as in the first embodiment. This is involved in the problem of the precision or the speed of the abnormality detection. If it is desired to strictly sample, it is preferable to frequently sample, however, from the practical viewpoint, it is not necessary to frequently sample in synchronous with the peak of the carrier wave signal.

The frequency divider circuit 32 is arranged between the peak detection circuit 20 and the SH circuit 26 and the SH circuit 28, and the operation thereof is as follows. In accordance with the operation of the frequency divider circuit 32, the sin angle signal (sin θ) is held from the sin signal in the SH circuit 26 in synchronous with the slow cycle corresponding to the integral multiple of the cycle of the carrier wave without synchronizing with the peak time of the carrier wave sin ωt, and the cos angle signal (cos θ) is held from the cos signal in the SH circuit 28. Further, each of the sin angle signal and the cos angle signal detected by the SH circuit 26 and the SH circuit 28 is input to the abnormal region judging circuit 30, and it is judged whether the signal is normal or abnormal.

As mentioned above, the loading number to the CPU circuit 16 and the processing number in accordance therewith are reduced by reading and judging the sin signal and the cos signal in synchronous with the slow cycle corresponding to the integral multiple of the cycle of the carrier wave, whereby the burden to the CPU circuit becomes small.

Further, in the case that the present invention is structured by the hardware, it is possible to detect the abnormality in the angle detecting device or the like by using the abnormal region judging circuit. Accordingly, since it is possible to doubly monitor the abnormality in the angle detecting device or the like by using the abnormality detecting function included in the resolver digital conversion circuit 14, it is possible to improve a reliability in comparison with the monitoring simply by the resolver digital conversion circuit.

In this case, in the case that the resolver digital conversion circuit detecting the rotation angle θ of the motor is out of order, the rotation angle θ detected by the resolver digital conversion circuit on the basis of the signal output from the angle detecting device lacks a reliability. Accordingly, even in the case that the resolver digital conversion circuit is out of order, it is possible to detect the rotation angle information having an equal precision to the information of the rotation angle output, for example, by the Hall sensors or the Hall ICs arranged per 120 degree around the rotor of the three-phase motor, by using the sin signal and the cos signal output from the angular resolver. A description will be given below of the principle thereof.

The sin angle signal (sin θ) and the cos angle signal (cos θ) are respectively detected by holding the sin signal and the cos signal in synchronous with the peak value of the carrier wave signal sin ωt or shifting at π/2 phase from the zero cross point from the sin signal (sin ωt·sin θ) and the cos signal (sin ωt·cos θ) output from the angular resolver serving as the angle detecting device.

Figure 12:
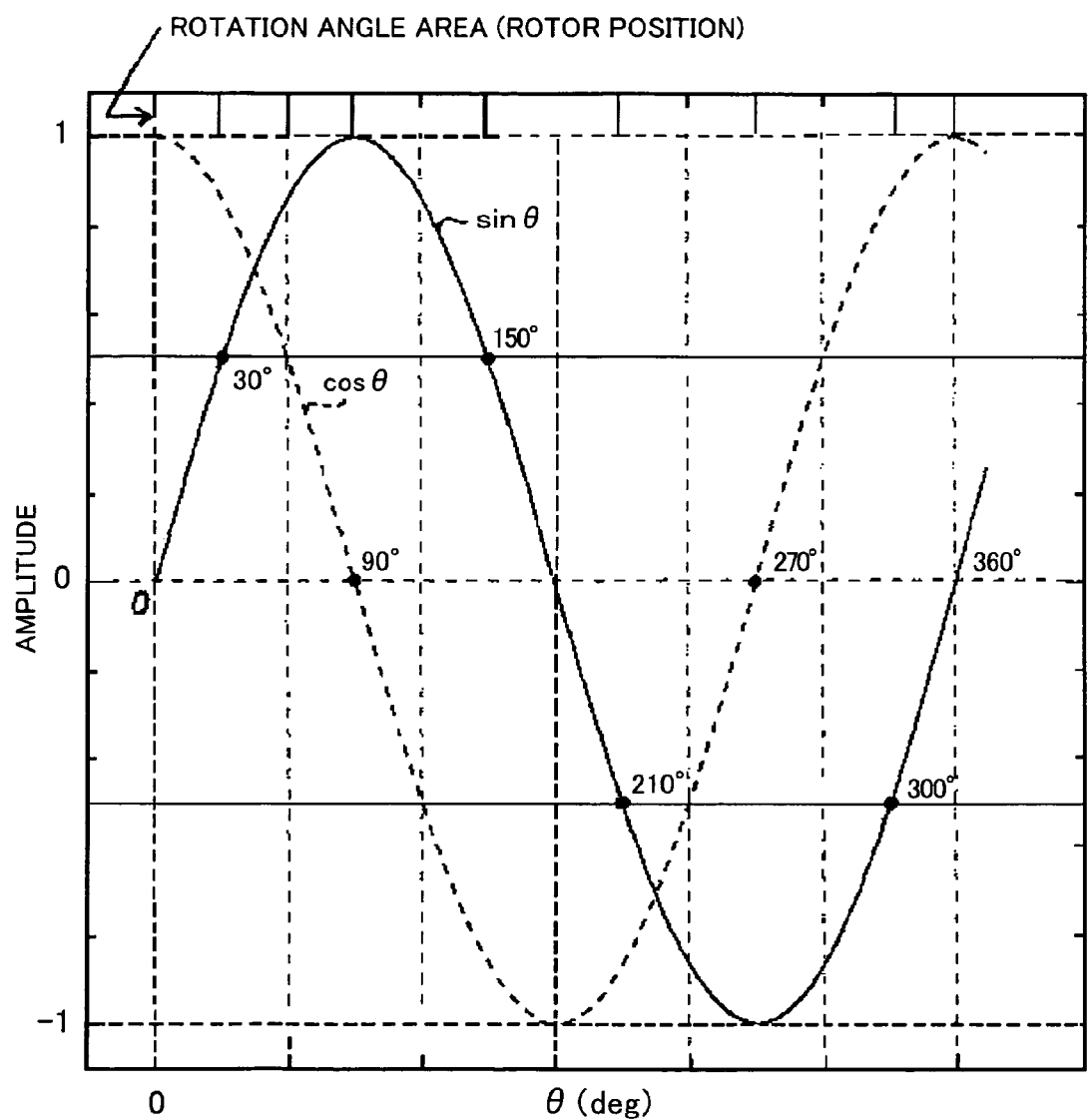
FIG. 12 is a view for explaining a principle for detecting a rotation angle signal in accordance with the present invention.

FIG. 12 shows the detected sin angle signal and cos angle signal. In this case, if the following process is applied to the sin angle signal and the cos angle signal, it is possible to obtain an equal information to the rotation angle signal output by three Hall sensors arranged at 120 degree around the rotor of the three-phase motor.

First, in order to determine the signal formed from the cos angle signal, a polarity of the cos angle signal is judged. In other words, it is judged whether the sign (cos θ) is positive or negative.

In the case that the cos θ is positive, C=sign (cos θ)=1 is set.

In the case that the cos θ is negative, C=sign (cos θ)=0 is set.

Next, in order to determine the signal formed from the sin angle signal, a magnitude is judged by using the level of the value of the sin angle signal and two threshold values ("0.5" and "−0.5"), and the judged results are set respectively as Level1 and Level2. It is specifically as follows.

In the case of sin θ>0.5, B=Level1 (sin θ>0.5)=1
in the case of sin θ<0.5, B=Level1 (sin θ>0.5)=0 and
in the case of sin θ<−0.5, A=Level2 (sin θ<−0.5)=1
in the case of sin θ>−0.5, A=Level2 (sin θ<−0.5)=0

Figure 13:
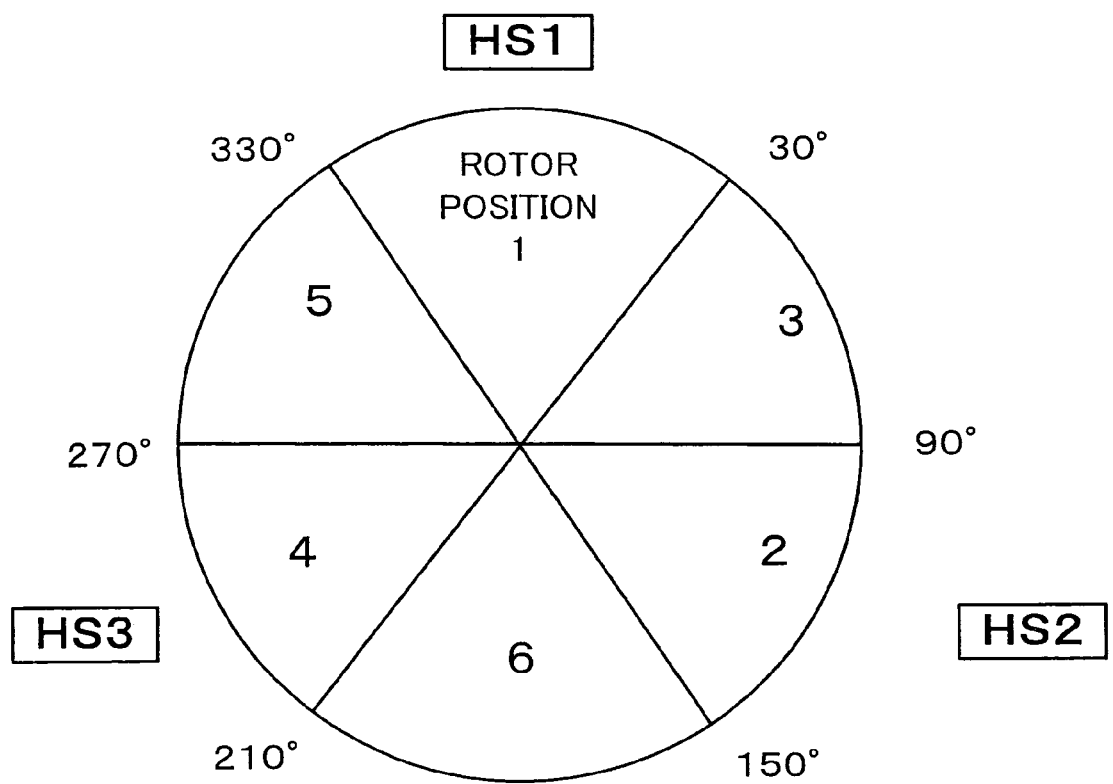
FIG. 13 is a view showing a relation between a Hall sensor signal and a rotation angle.

A rotation angle area obtained by dividing the rotor position of the motor into six sections with respect to 360 degree is shown in FIG. 13. Defining the polarity of the cos θ corresponding to the angle area=C, the level judging of the sin θ Level1=B, Level2=A and S1=4A+2B+C, respectively, and showing the relation between the rotation angle area and A, B and C by a table, Table 1 is obtained. In this case, the three-bit signals (A, B, C) become a signal formed from the cos angle signal and a three-bit rotation angle signal formed by the sin angle signal, however, the signal S1 corresponds to a modulated three-bit rotation angle signal.

Signal obtained by polarity of resolver signal and judged level of resolver signal.

TABLE 1

| Rotation angle area | S1 = 4A + 2B + C | A = Level2 | B = Level1 | C = sign (cos θ) |
|---|---|---|---|---|
| 330°~30° | 1 | 0 | 0 | 1 |
| 30°~90° | 3 | 0 | 1 | 1 |
| 90°~150° | 2 | 0 | 1 | 0 |
| 150°~210° | 0 | 0 | 0 | 0 |
| 210°~270° | 4 | 1 | 0 | 0 |
| 270°~330° | 5 | 1 | 0 | 1 |
| None (error) | 6 | 1 | 1 | 0 |
| None (error) | 7 | 1 | 1 | 1 |

In the rotation angle area (330 degree to 30 degree), the combined three-bit rotation angle signal (Level2, Level1, sign (cos θ)) prepared on the basis of the output signal from the angular resolver becomes (0, 0, 1). In the rotation angle area (30 degree to 90 degree), the three-bit rotation angle signal of (0, 1, 0) is formed. S1=6, 7 indicates a failure in the angular resolver or the resolver digital conversion circuit.

In the same manner, as shown in FIG. 13, the output signals of three Hall sensors HS1, HS2 and HS3 arranged per 120 degree around the rotor are respectively defined as A=output signal of HS3, B=output signal of HS2, C=output signal of HS1, and S2=4A+2B+C. The values of S2, A, B and C in correspondence to the rotation angle area in Table 1 are shown as Table 2.

TABLE 2

| | Hall sensor signal | | | |
|---|---|---|---|---|
| Rotation angle area | S2 = 4A + 2B + C | A = HS3 | B = HS2 | C = HS1 |
| 330°~30° | 1 | 0 | 0 | 1 |
| 30°~90° | 3 | 0 | 1 | 1 |
| 90°~150° | 2 | 0 | 1 | 0 |
| 150°~210° | 6 | 1 | 1 | 0 |
| 210°~270° | 4 | 1 | 0 | 0 |
| 270°~330° | 5 | 1 | 0 | 1 |
| None (error) | 0 | 0 | 0 | 0 |
| None (error) | 7 | 1 | 1 | 1 |

In this case, viewing a relation between the rotation angle area and the three-bit rotation angle signal (hereinafter, refer to as "three-bit signal") constituted by (A, B, C), first, the three-bit signals do not become the same value between the respective rotation angle areas in Table 1, and it is possible to correspond the rotation angle area of the rotor and the three-bit signal one-to-one. Next, in Table 2, the three-bit signals do not become the same value between the respective rotation angle areas, and it is possible to correspond the rotation angle area of the rotor and the three-bit signal one-to-one.

Next, comparing Table 1 with Table 2, the three-bit signal in Table 1 and the three-bit signal in Table 2 are the same in all the rotation angle areas except the rotation angle area (150 degree to 210 degree). For example, if the rotor is in the rotation angle area (330 degree to 30 degree), the three bit signal (0, 0, 1) in Table 1 and the three-bit signal (0, 0, 1) in Table 2 are the same, and in the rotation angle area (30 degree to 90 degree), the three-bit signal (0, 1, 1) in Table 1 and the three-bit signal (0, 1, 1) in Table 2 are the same. The three-bit signal (0, 0, 0) in Table 1 and the three-bit signal (1, 1, 1) in Table 2 are different only in the rotation angle area (150 degree to 210 degree). Expressing by the relation between S1 and S2, in the rotation angle area (150 degree to 210 degree), S1=0 and S2=6 is established, and the step S1 and the step S2 have different values.

Accordingly, in the different portion between Table 1 and Table 2, the three-bit signal of the output of the angle processing circuit and the three-bit output signal of the Hall sensor become equal in all the rotation angle areas of the rotor by being reconverted. For example, in the rotation angle area (150 degree to 210 degree), if (0, 0, 0) in Table 1 is reconverted into (1, 1, 0) in Table 2, the three-bit rotation angle signal detected by the angle processing circuit having the output signal of the angular resolver as the input can be all reconverted into the three-bit rotation angle signal obtained by the Hall sensor. In the case of specifically carrying out, the conversion between the S1 signal and the S2 signal is easier than the conversion between the three-bit signals. In this case, since the three-bit rotation angle signal corresponds to the equivalent signal to the Hall sensor, it is possible to detect the abnormality of the angle processing circuit by applying the Hall sensor abnormality detecting method (for example, Japanese Patent Application No. 2003-352275) or the like.

On the other hand, it has been conventionally well known that the motor can be controlled by a rectangular wave current on the basis of the three-bit rotation angle signal formed by the signals of three Hall sensors arranged per 120 degree around the rotor of the motor. In other words, if the three-bit rotation angle signal detected by the angle processing circuit is converted into the three-bit rotation angle signal of the Hall sensor, it is apparent that the motor can be controlled by the rectangular wave current in the same manner.

Further, the description mentioned above corresponds to a description obtained by employing the three-phase motor as one example, however, even in the other n-phase motors (five-phase, seven-phase, . . . ) than the three-phase, it goes without saying that it is possible to obtain an equivalent rotation angle signal to a rotation angle signal obtained by the Hall sensors arranged around the n-phase motor, by suitably executing a level judgment of the sin angle signal and the cos angle signal at n positions (n bits).

Third Embodiment

Figure 1:
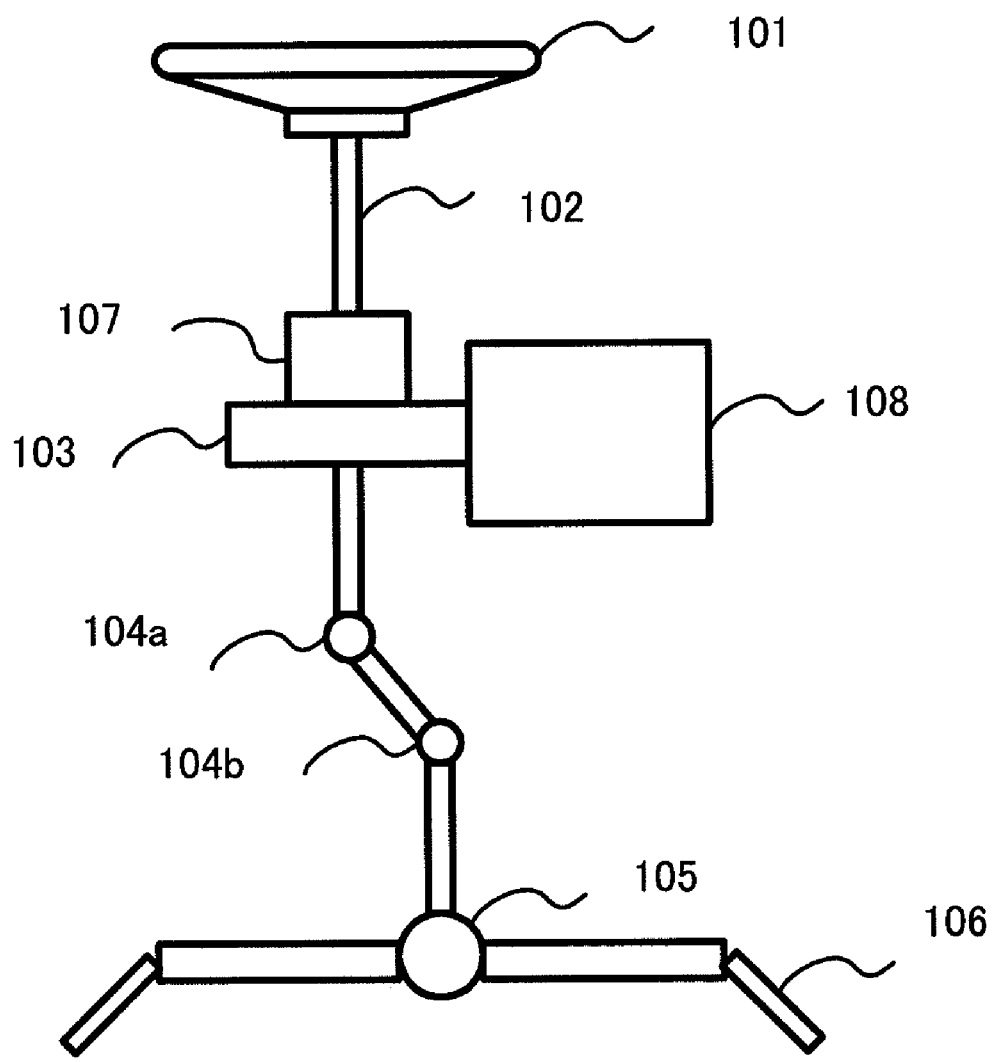
FIG. 1 is a schematic view of a general electric power steering apparatus.
Figure 2:
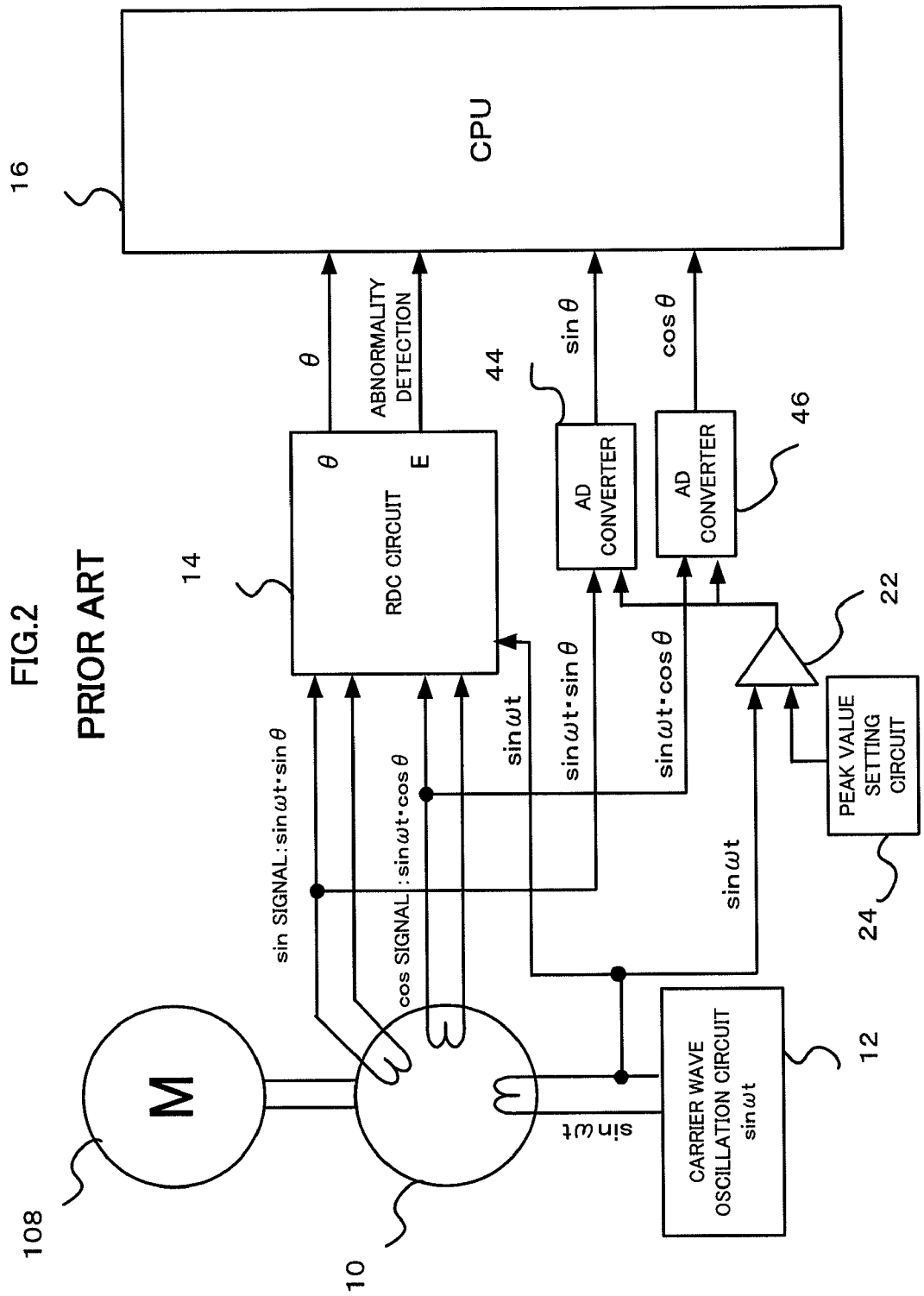
FIG. 2 is a block diagram showing an example of a conventional apparatus for detecting an abnormality of an angle detecting device.
Figure 3:
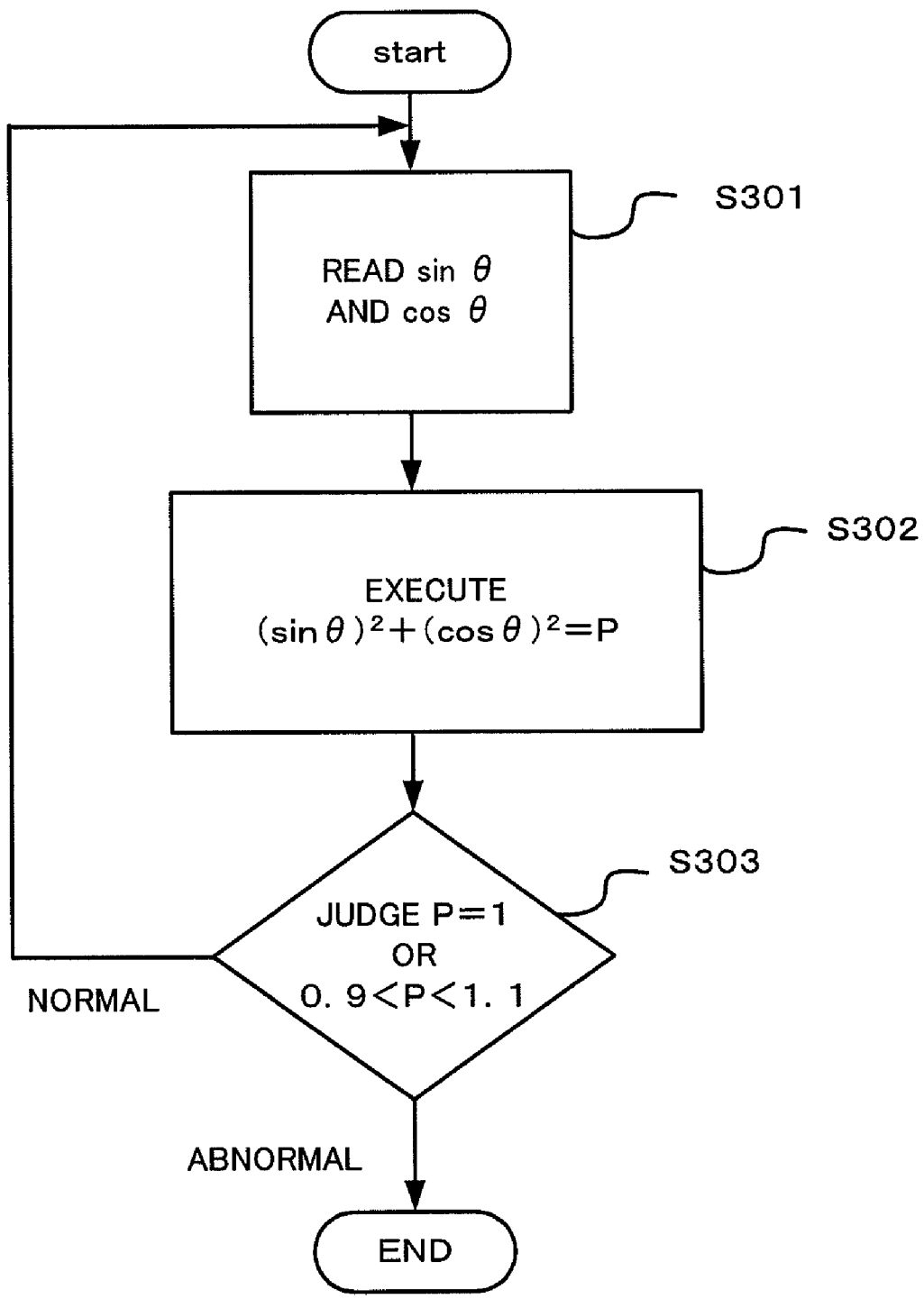
FIG. 3 is a flow chart showing an example of a conventional process of detecting an abnormality.
Figure 4:
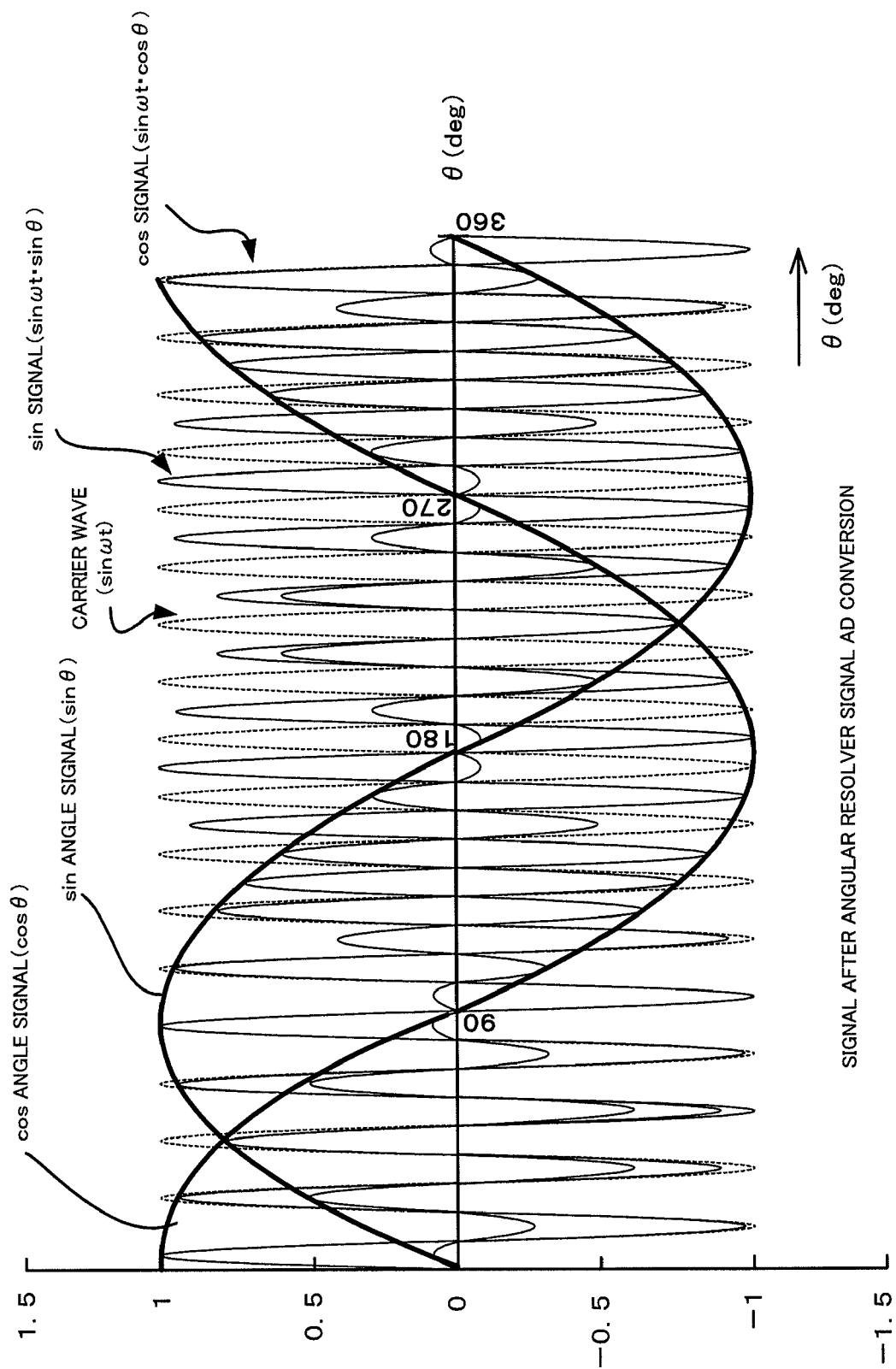
FIG. 4 is a view showing a relation among a carrier wave signal, a sin signal and a cos signal.
Figure 5:
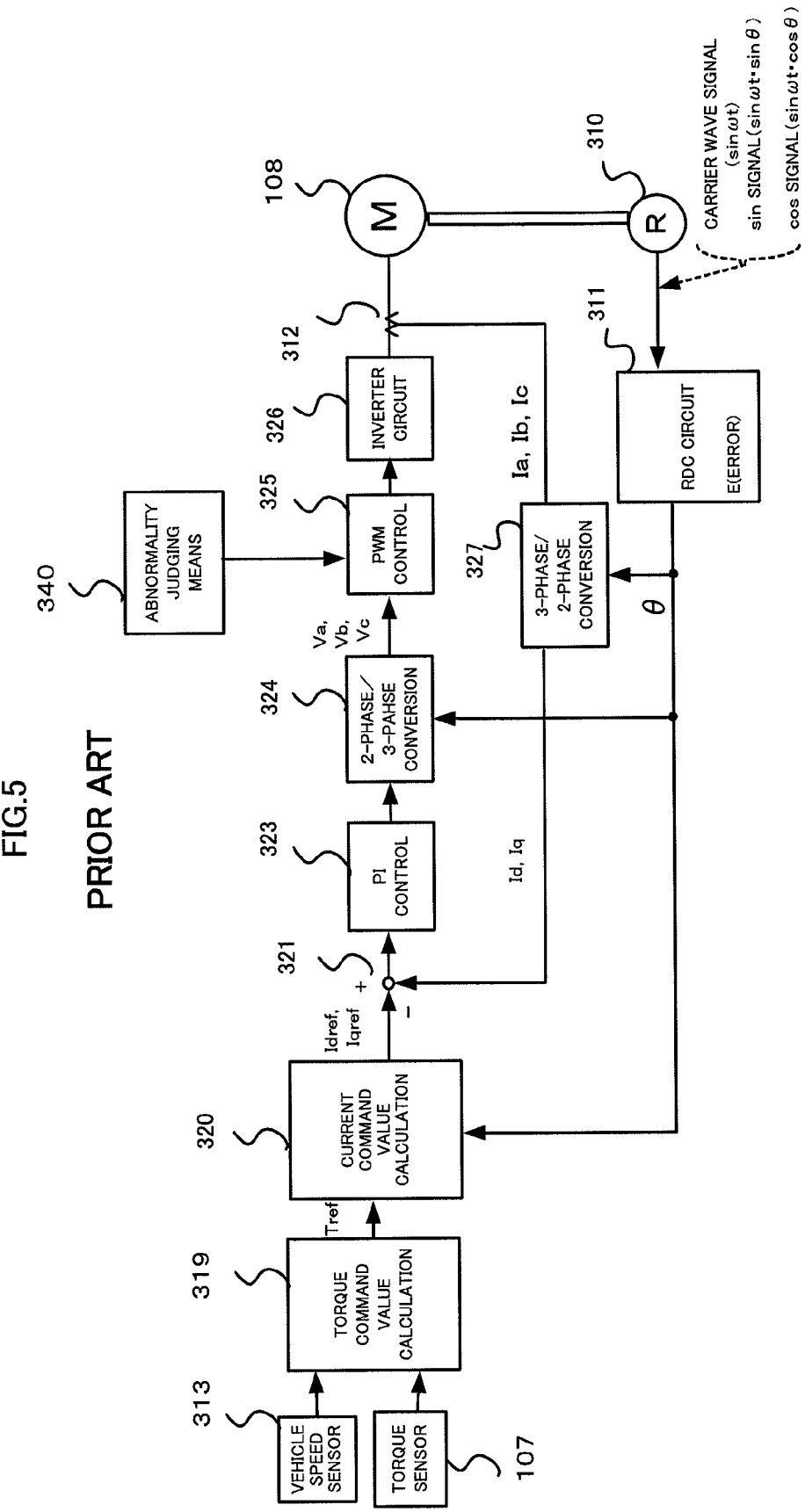
FIG. 5 is a block diagram showing an example of a conventional control unit corresponding to an abnormality in detecting a rotation angle of a motor.
Figure 14:
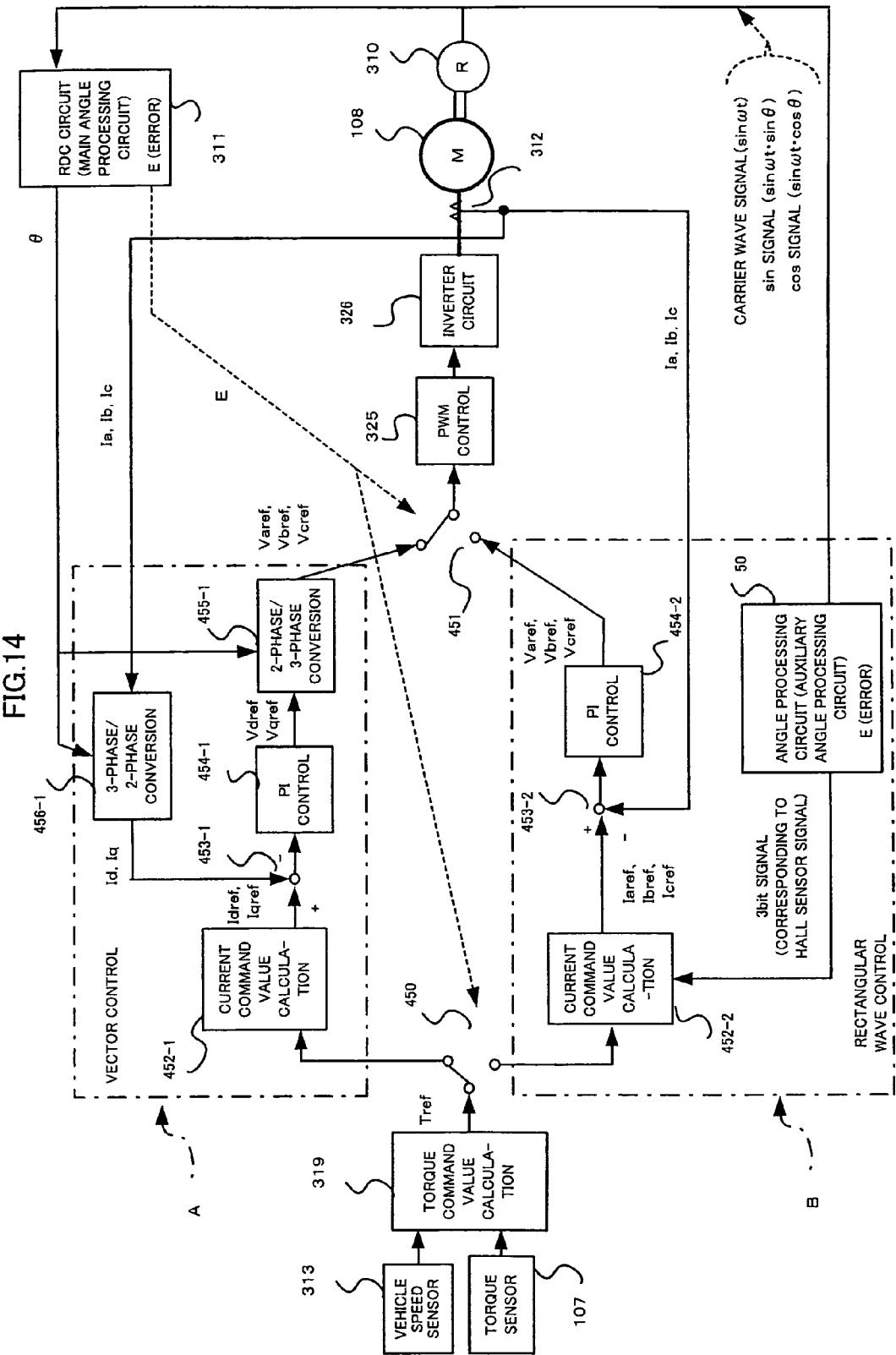
FIG. 14 is a block diagram of an apparatus showing a third embodiment in accordance with the present invention.
Figure 15:
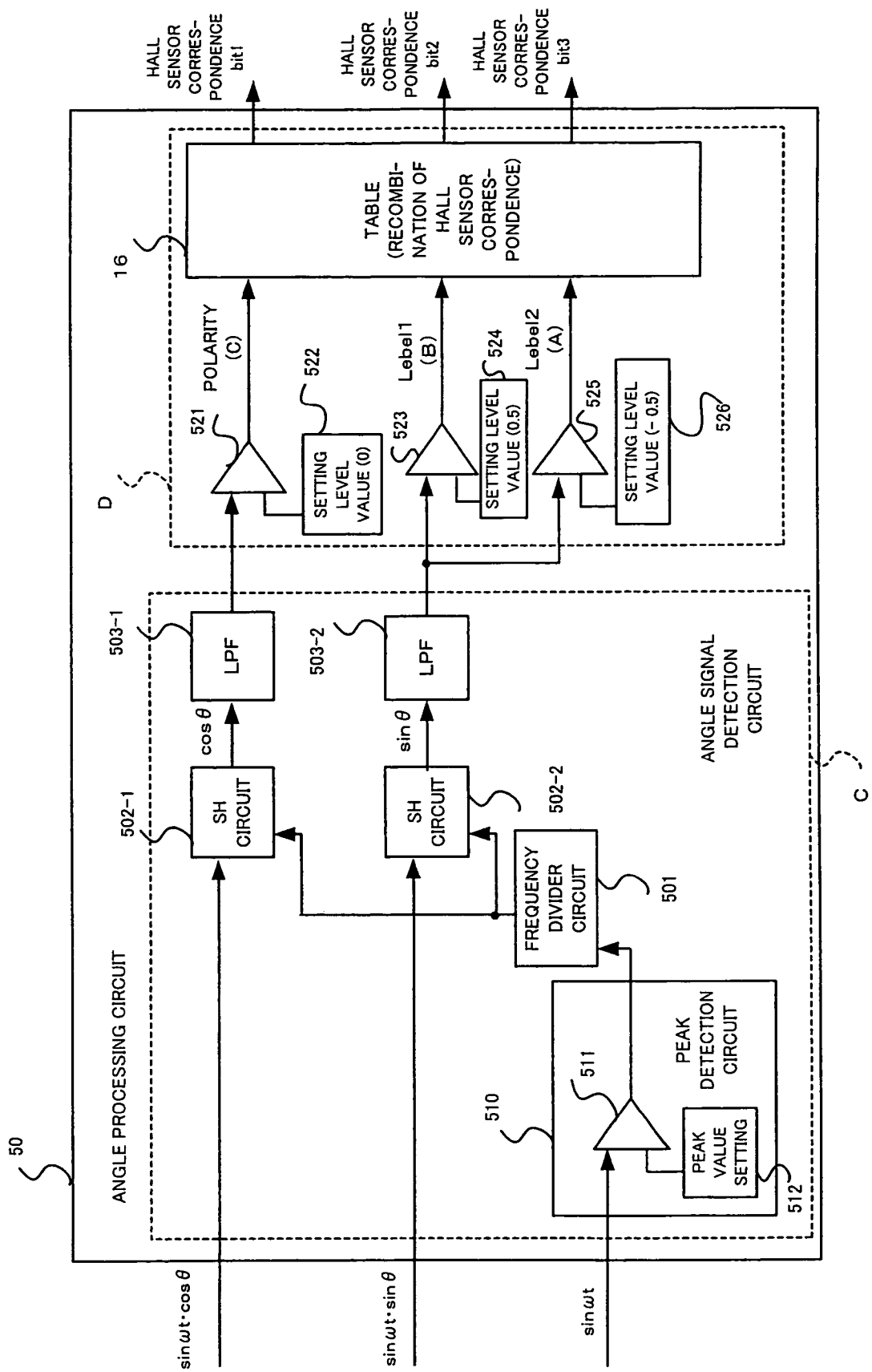
FIG. 15 is a block diagram showing an example of a detailed structure of an angle processing means in accordance with the present invention.

A description will be given of a preferable embodiment in accordance with the present invention with reference to FIG. 14 showing in correspondence to FIG. 5, on the basis of the theory of the present invention described above. FIG. 14 is a block diagram showing an entire of a control unit for electric power steering apparatus including an angle processing circuit 50 in accordance with the present invention, and FIG. 15 is a block diagram showing details of the angle processing circuit 50 by actualizing the angle processing circuit 50 by a hardware.

The embodiment in FIG. 14 is structured by a vector control portion (a portion surrounded by a broken line A) used in a normal control, and a rectangular wave control (a portion surrounded by a broken line B) used in an abnormal matter in the case that the angular resolver or the resolver digital conversion circuit becomes abnormal. Since a resolver digital conversion circuit 311 is generally provided with an earth terminal corresponding to an abnormality detecting terminal monitoring its own abnormality, switching between the vector control portion A and the rectangular wave control portion B utilizes a failure detecting function of the resolver digital conversion circuit 311. Further, in the case that the angle processing circuit 50 is provided with the earth terminal of the abnormality detecting terminal monitoring its own abnormality, it is possible to execute the switching on the basis of the earth terminal signal of the angle processing circuit 50.

First, a description will be given of the vector control portion which is described in the prior art used in the general control. The torque value Tr detected by the torque sensor 107 and the vehicle speed value V detected by the vehicle speed sensor 313 are input to the torque command value calculating portion 319, and the torque command value Tref is output. Further, a switch 450 generally selects the vector control portion A on the basis of the signal of the output terminal E of the failure detecting function of the resolver digital conversion circuit 311.

The torque command value Tref is input to a current command value calculating portion 452-1, and current command values Idref and Iqref are calculated. The calculated current command value Idref and Iqref, and the currents Id and Iq detected by the current detecting circuit 312 and converted by a three-phase/two-phase conversion portion 456-1 are input to a subtraction portion 453-1, and deviations ΔId and ΔIq (ΔId=Idref−Id, ΔIq=Iqref−Iq) are calculated. Next, the calculated deviation ΔI is input to a PI control portion 454-1, and voltage command values Vdref and Vqref are calculated. The voltage command values Vdref and Vqref are input to a two-phase/three-phase converting means 455-1, and are converted into voltage command values Varef, Vbref and Vcref which are converted into three phase.

A switch 451 generally selects the voltage command values Varef, Vbref and Vcref output from the two-phase/three-phase conversion portion 455-1 as a voltage command value, on the basis of a signal of the output terminal E of the failure detecting function of the resolver digital conversion circuit 311. A PWM control portion 325 generates a PWM signal on the basis of the voltage command value, and an inverter circuit 326 supplies the motor currents Ia, Ib and Ic to the motor 108 on the basis of the PWM signal.

In general, the motor 108 executes the control on the basis of the sine-wave current by using the vector control. This can be executed by precisely detecting the rotation angle θ of the motor 108. In specific, in the information of the rotation angle θ of the motor 108, the carrier wave sin ωt, the sin signal and the cos signal output from the angular resolver 310 are input to the resolver digital conversion circuit 311 serving as the main angle processing circuit, and the rotation angle θ is output. Further, the rotation angle θ is utilized in the two-phase/three-phase conversion, three-phase/two-phase conversion or the like in the process of the control motion mentioned above. In the case that the resolver digital conversion circuit 311 is normally operated, the rotation angle θ output from the resolver digital conversion circuit is a reliable information having a high precision. Accordingly, it is preferable to execute the control on the basis of the rotation angle.

However, in the case that the resolver digital conversion circuit 311 is out of order, and in the case that it is desired to continuously maintain the assist by using the electric power steering apparatus, it is possible to continue the assist by switching from the resolver digital conversion circuit 311 to the angle processing circuit 50 and driving the motor 108 in accordance with the rectangular wave current control on the basis of the three-bit rotation angle signal corresponding to the Hall sensor output by the angle processing circuit 50.

A description will be given of the motor control in accordance with the rectangular wave current control in the case that the angular resolver 310 and the resolver digital conversion circuit 311 become abnormal. Since the angle processing circuit 50 is described in detail later, a description will be given first of the rectangular wave current control.

The resolver digital conversion circuit 311 self-monitors the angular resolver 310 and the resolver digital conversion circuit 311, and outputs a failure signal from the earth terminal if an abnormality is generated. Accordingly, the switch 450 and the switch 451 are changed, the switch 450 couples the torque command value calculating portion 319 and the current command value calculating portion 452-2, and the switch 451 couples the PI control portion 454-2 and the PWM control portion 325.

Therefore, the torque command value Tref output from the torque command value calculating portion 319 and the three-bit rotation angle signal corresponding to the output of the angle processing circuit 50 serving as the auxiliary angle processing circuit are input to the current command value calculating portion 452-2, and the current command value Iaref, Ibref and Icref for controlling the rectangular wave current are output. Next, the deviation between the motor currents Ia, Ib and Ic detected by the current detecting device 312, and the current command values Iaref, Ibref and Icref is calculated by the subtraction portion 453-2, and the deviation is input to the PI control portion 454-2. The PI control portion 454-2 outputs the voltage command value Varef, Vbref and Vcref.

The voltage command values Varef, Vbref and Vcref are input to the PWM control portion 325 via the switch 451. The PWM control portion 325 generates the PWM signal for controlling the rectangular wave current on the basis of the voltage command value, and the inverter circuit 326 supplies the rectangular wave currents Ia, Ib and Ic to the motor 108. As mentioned above, when the rotation angle θ of the motor cannot be correctly detected, it is possible to execute the rectangular wave current control on the basis of the three-bit rotation angle signal output by the angle processing circuit 50, and it is possible to continue the assist of the electric power steering apparatus.

Next, a description will be given of detailed structure and operation of the angle processing circuit 50 corresponding to a main portion of the present invention, with reference to FIG. 15.

The angle processing circuit 50 inputs the cos signal, the sin signal and the carrier wave signal so as to output the three-bit rotation angle signal. The carrier wave signal sin ωt is input to the peak detection circuit 510, and the peak value of the carrier wave shown by the peak value setting device 512 and the carrier wave are compared by the level detection circuit 511, whereby it is possible to detect the peak time of the carrier wave. Otherwise, the peak time may be detected by detecting the zero cross point of the carrier wave and shifting the phase at π/2.

Next, the signal indicating the peak time of the carrier wave output from the peak detection circuit 510 is input to the frequency divider circuit 501. The frequency divider circuit 501 is provided for picking up the frequency which is an integral multiple of the frequency of the carrier wave. In this case, the present invention can be achieved even if the frequency divider circuit 501 does not exist. In the case that the frequency divider circuit 501 does not exist, the timing of the sample hold of the sin signal and the cos signal mentioned below is frequently held in synchronous with the frequency of the carrier wave. On the other hand, in the case that the frequency divider circuit 501 exists, the timing of the sample hold of the sin signal and the cos signal is set to an integral multiple part of the frequency of the carrier wave, and the sample hold is executed at the frequency. With or without the frequency divider circuit or the frequency of the frequency dividing is determined on the basis of combination of the roughness in precision of the determined sin signal and cos signal and a load of the frequency for sample holding.

Next, in the case that the frequency divider circuit 501 does not exist in synchronous with the timing of the output signal of the frequency divider circuit 501, the cos angle signal (cos θ) is sample held by sample holding with respect to the input cos signal (sin ωt·cos θ) in the SH circuit 502-1, in synchronous with the timing of the output signal of the peak detection circuit 510, and the sin angle signal (sin θ) is sample held by sample holding with respect to the input sin signal (sin ωt·sin θ) in the SH circuit 502-2. Further, in order to remove the noise, the cos angle signal and the sin angle signal respectively pass a low-pass filter circuit (hereinafter, refer to as "LPF circuit") 503-1 and an LPF circuit 503-2. An angle signal detection circuit corresponding to a portion surrounded by a broken line C in FIG. 15 corresponding to a circuit for detecting the cos angle signal and the sin angle signal are known as the prior art.

A description will be given below of a portion corresponding to a main portion of the present invention.

The cos angle signal output from the LPF circuit 503-1 is input to a level detection circuit 521 for detecting a polarity of Table 1 mentioned above. In the same manner, the sin angle signal output from the LPF circuit 503-2 is input to each of a level detection circuit 523 for detecting the Level1 in Table 1 and a level detection circuit 525 for detecting the Level2 in Table 1. Further, a set value (0) indicated by a setting device 522 and the cos angle signal are compared in the level detection circuit 521, whereby the sign (cos θ) corresponding to the polarity of the cos angle signal is judged, for example, in the case that it is positive, "1" is output, and in the case that it is negative, "0" is output.

Further, the sin angle signal input to the level detection circuit 523 is compared with a set value (0.5) indicated by a setting device 524. In the case that the sin angle signal is larger than 0.5, "1" is output, and in the case that the sin angle signal is smaller than 0.5, "0" is output, whereby the value of the Level1 is determined. In the same manner, the sin angle signal input to the level detection circuit 525 is compared with a set value (−0.5) indicated by a setting device 526. In the case that the sin angle signal is smaller than −0.5 (in the case that an absolute value of the sin angle signal is larger than 0.5), "1" is output, and in the case that the sin angle signal is larger than −0.5 (in the case that an absolute value of the sin angle signal is smaller than 0.5), "0" on is output, whereby the value of the Level2 is determined. The output of each of the level detection circuits, that is, the three-bit signal formed by the outputs signals of the level diction circuit 521, the level detection circuit 523 and the level detection circuit 525 forms a base of the rotation angle signal.

In this case, "0.5" and −0.5" indicated by the setting device 524 and the setting device 526 correspond to values indicating 50% level of the case that the peak value of the sin angle signal is set to "1".

The three-bit signal constituted by the outputs of the respective level detection circuits is input to the conversion circuit 520 for forming the same output aspect as the signal of the Hall sensors arranged per 120 degree in the motor, and a determined three-bit rotation angle signal is output from the conversion circuit 520. The conversion circuit 520 may be structured by a table, and may be structured such that the three-bit signal corresponding to the output of the Hall sensor is output to the three-bit input signal. The three-bit signal output from the conversion circuit 520 via the process in each of the circuits described above finally becomes the rotation angle signal corresponding to the output of the angle processing circuit 50.

In this case, in the embodiment mentioned above, the motor is controlled by the rectangular wave current by using the polarity using the cos angle signal and the three-bit rotation angle signal in which the judged results of the level value of the sin angle signal are set to the value Level1 and Level2, however, it goes without saying that the motor can be controlled by the rectangular wave current by using the polarity using the sin angle signal, and the three-bit rotation angle signal in which the judged results of the level values of the cos angle signals are set to the values Level1 and Level2.

Figure 16:
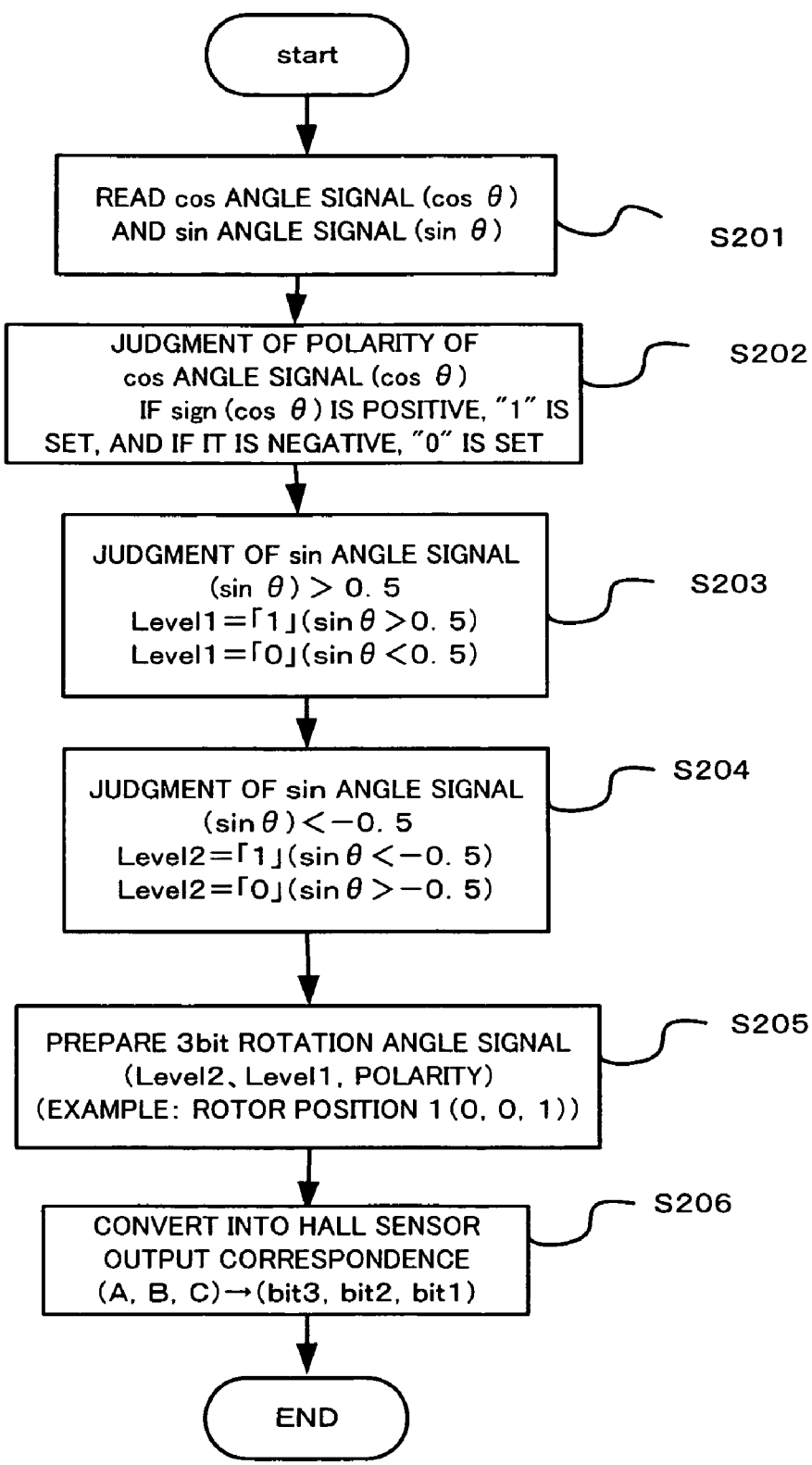
FIG. 16 is a flow chart showing an example of an operation in the case of processing a part of the angle processing means in accordance with the present invention by a software.

Further, in the embodiment mentioned above, the description is given of the case that the angle processing means is achieved by the hardware, however, a part of the angle processing means can be achieved by a method shown in a flow chart in FIG. 16 in a software manner.

First, the structure is divided into a portion processed by a hardware and a portion processed by a software. The portion processed by the hardware detects the sin angle signal (sin θ) and the cos angle signal (cos θ) of the angle processing circuit 50 in FIG. 14, and the process is executed by the hardware until the signals pass through the LPF circuit 503-1 and the LPF circuit 503-2 (in the angle signal detecting circuit surrounded by the broken line A). The portion forming the three-bit signal corresponding to the Hall sensor detection signal from the thereafter process (the portion surrounded by the broken line B) is processed by the software in the CPU circuit, as mentioned below.

In other words, the cos angle signal (cos θ) and the sin angle signal (sin θ) are read (a step S201), and the polarity of the cos angle signal is judged. If the polarity (sign (cos θ)) is positive, "1" is set, and if it is negative, "0" is set (a step S202). On the other hand, it is judged whether the sin angle signal (sin θ) is larger or smaller than 0.5. In other words, if sin θ>0.5 is established, Level1="1" is established, and if sin θ<0.5 is established, Level1="0" is established (a step S203). In the same manner, it is judged whether the sin angle signal is larger or smaller than −0.5. In other words, if sin θ<−0.5 is established, Level2="1" is established, and if sin θ>−0.5 is established, Level2="0" is established (a step S204). Next, the sign (cos θ) corresponding to the polarity of the determined cos angle signal and the three-bit signal constituted by Level1 and Level2 are formed (a step S205). Finally, the three-bit signal is converted into the signal corresponding to the Hall sensor signal, and the three-bit rotation angle signal is calculated (a step S206). In accordance with the structure mentioned above, it is possible to achieve the present embodiment by the software.

Fourth Embodiment

Figure 17:
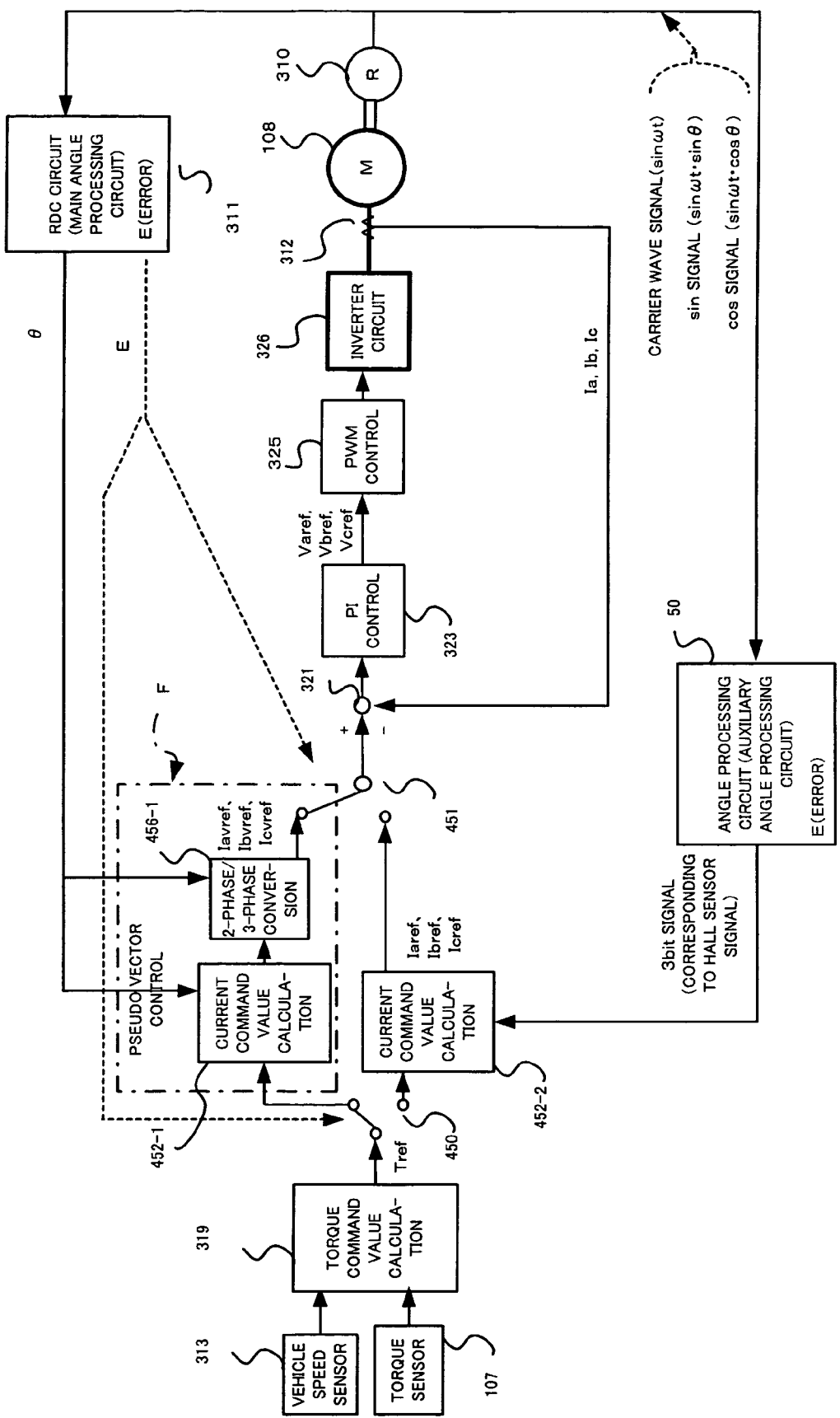
FIG. 17 is a block diagram showing an apparatus in accordance with a fourth embodiment of the present invention.

FIG. 17 shows a fourth embodiment in accordance with the present invention. The fourth embodiment corresponds to a structure obtained by replacing the vector control portion A in accordance with the third embodiment by a pseudo vector control portion F. The pseudo vector control portion (hereinafter, refer to as "PVC control portion") F calculates the current command value as three phases Iaref, Ibref and Icref, however, utilizes a vector control in the middle of calculating the current command value from the torque command value Tref. Accordingly, since it is necessary to correctly detect the rotation angle θ of the motor, it is necessary that the angular resolver 310 and the resolver digital conversion circuit 311 are correctly operated.

First, in the case that the angular resolver 310 and the resolver digital conversion circuit 311 are correctly operated, the switch 450 and the switch 451 select the input of the current command value calculating portion 452-1 and the output of the two-phase/three-phase conversion portion 456-1. The current command value calculating portion 452-1 and the two-phase/three-phase conversion portion 456-1 calculate current command values Iavref, Ibvref and Icvref for controlling PVC. The motor is controlled on the basis of the current command value.

On the other hand, in the case that the angular resolver 310 and the resolver digital conversion circuit 311 are out of order, in the case that the resolver digital conversion circuit 311 described in the third embodiment detects the failure, the rectangular wave current control is executed in the same manner.

The description is given above of the case that the main angle processing circuit, the auxiliary angle processing circuit and the corresponding control portion exist, however, in the case that the resolver digital conversion circuit does not exist, it is possible to always execute the rectangular wave current control of the motor on the basis of the three-bit rotation angle signal output by the angle processing means in accordance with the present invention, in addition to the time when the resolver digital conversion circuit is out of order as mentioned above.

Further, in the case that the resolver digital conversion circuit is set to the main angle processing means, and the angle processing means in accordance with the present invention is set to the auxiliary angle processing means, in the case that the resolver digital conversion circuit is normally operated, it is possible to control the motor by the sine-wave current on the basis of the rotation angle θ output by the resolver digital conversion circuit, and in the case that the resolver digital conversion circuit is out of order, it is possible to control the motor by switching the motor from the sine-wave current control to the rectangular wave current on the basis of the three-bit rotation angle signal output by the auxiliary angle processing means.

Accordingly, in the case that the resolver digital conversion circuit corresponding to the main angle processing means is out of order, and the motor is controlled by using the auxiliary angle processing means, there can be obtained an excellent effect that the motor can be controlled by the rectangular wave current without being limited by the rotation angle (the rotation position) of the motor at a time when the resolver digital conversion circuit is out of order. Further, it is possible to continuously control the electric power steering apparatus without being limited by the rotation angle (the rotation position) of the motor at a time when the resolver digital conversion circuit is out of order corresponding to the conventional problem, and there can be expected an excellent effect that a handle operation suddenly changes to a manual operation and no uncomfortable feeling is generated in the handle operation.

In accordance with the present invention, in order to judge the abnormality in the angle detecting device, since it is possible to judge the abnormality by mapping sin θ and cos θ to the abnormal region judging map as they are without executing the calculation of $(\sin \theta)^2 + (\cos \theta)^2$ with respect to sin θ and cos θ obtained on the basis of the information output from the angle detecting device, the processing speed is higher in comparison with the conventional structure, and there can be obtained an excellent effect that no burden is applied to the CPU in the case of the software process, or a lot of hardware parts are not required for the process in the case of the hardware process.

In the case that the structure is provided with the angle processing means which can detect the sin angle signal and the cos angle signal respectively from the sin signal and the cos signal, and can detect the rotation angle signal formed by the signal formed from the detected cos angle signal and the signal formed from the sin angle signal, since the rotation angle signal is equivalent to the rotation angle signal output by the Hall sensor arranged around the motor, there can be obtained an effect that it is possible to provide the control unit of the electric power steering apparatus which can control the motor by the rectangular wave current. For example, in the case that the motor is constituted by the three-phase motor, if the structure is provided with an angle processing means which can detect a three-bit rotation angle signal formed by a one-bit signal indicating positive or negative of the cos angle signal and a two-bit signal indicating a level of the value of the sin angle signal, since the three-bit rotation angle signal is equivalent to the rotation angle signal output by the Hall sensors arranged per 120 degree around the three-phase motor, there can be obtained an effect that it is possible to provide the control unit of the electric power steering apparatus which can control the motor by the rectangular wave current.

Further, in the case that the rotation angle signal is detected by the double system comprising the main angle processing means and the auxiliary angle processing means, when the main angle processing means is out of order, it is possible to maintain the assist by the electric power steering apparatus without changing to the manual operation, by controlling the motor by the rectangular wave current by means of the auxiliary angle processing means constituted by the angle processing means.

INDUSTRIAL APPLICABILITY

It is possible to provide the electric power steering apparatus in which the assist does not stop even if the angle processing means is out of order and a failure is hard to be generated, by arranging the simple auxiliary angle processing means as in the present invention. Since the present invention prepares the map which can judge whether the combination of sin $\theta$ and cos $\theta$ is normal or abnormal, and judges by mapping the combination of the detected sin $\theta$ and cos $\theta$, the process can be easily executed, the processing speed is high, the burden to the CPU can be reduced, and it is possible to increase an entire function.

What is claimed is:

1. A control unit for electric power steering apparatus for applying a steering assist force to a steering system of a vehicle by a motor, comprising:
    an angle detecting device for detecting a rotation angle ($\theta$) of the motor necessary for controlling the motor which is supplied a carrier wave signal (sin $\omega t$) having a predetermined frequency and generates a sin signal (sin $\omega t \cdot \sin \theta$) having a wave shape obtained by modulating an amplitude of said carrier wave signal by sin $\theta$ and a cos signal (sin $\omega t \cdot \cos \theta$) having a wave shape obtained by modulating the amplitude of said carrier wave signal by cos $\theta$; and
    an abnormal region judging map constituted by two values including a value corresponding to said sin $\theta$ and a value corresponding to said cos $\theta$ and constituted by a normal region and an abnormal region;
    wherein said abnormal region judging map sets the value corresponding to said sin $\theta$ to a value in an x-coordinate and sets the value corresponding to said cos $\theta$ to a value in a Y-coordinate, and a region surrounded by a quadrangle $\alpha$ structured on a region constituted by an X-axis and a Y-axis orthogonal to each other around an origin in which both of the values in the X-coordinate and the Y-coordinate are zero, and a quadrangle $\beta$ smaller than said quadrangle $\alpha$ constituted around said origin forms a normal region, and
    an abnormality of said angle detecting device is judged by mapping said sin $\theta$ and said cos $\theta$ respectively calculated from said sin signal and said cos signal to said abnormal region judging map.

2. The control unit for electric power steering apparatus as claimed in claim 1, wherein the control unit detects said sin $\theta$ and said cos $\theta$ in synchronous with said carrier wave signal or at an integral multiple of cycle of the cycle of said carrier wave.

3. The control unit for electric power steering apparatus as claimed in claim 1 or 2, wherein the control unit is provided with an angle detecting process circuit detecting an abnormality of said angle detecting device from said carrier wave signal, said sin $\theta$ and said cos $\theta$ and said abnormal region judging map, and doubly monitoring the abnormality of said angle detecting device by said angle detecting process circuit and said abnormal region judging map.

4. A control unit for electric power steering apparatus for applying a steering assist force to a steering system of a vehicle by a motor, comprising:
    an angle detecting device for detecting a rotation angle ($\theta$) of the motor necessary for controlling the motor which is supplied a carrier wave signal (sin $\omega t$) having a predetermined frequency
    and generates a sin signal (sin $\omega t \cdot \sin \theta$) having a wave shape obtained by modulating an amplitude of said carrier wave signal by sin $\theta$ and a cos signal (sin $\omega t \cdot \cos \theta$) having a wave shape obtained by modulating the amplitude of said carrier wave signal by cos $\theta$; and
    an angle processing means respectively detecting the sin angle signal (sin $\theta$) and the cos angle signal (cos $\theta$) from said sin signal and said cos signal, and outputting a rotation angle signal formed by a signal formed by said cos angle signal and a signal formed by said sin angle signal;
    wherein said motor is constituted by a three-phase brushless motor, the signal formed by said cos angle signal is constituted by a one-bit signal displaying positive or negative of the value of said cos angle signal, and the signal formed by said sin angle signal is constituted by two one-bit signals displaying respective results obtained by judging a size by two threshold values judging a level of the value of said sin angle signal, and
    said motor is controlled on the basis of said rotation angle signal.

5. The control unit for electric power steering apparatus as claimed in claim 4, wherein the control unit detects said sin angle signal and said cos angle signal from said sin signal and said cos signal respectively in
    synchronous with said carrier wave signal or at an integral multiple of cycle of the cycle of said carrier wave.

6. The control unit for electric power steering apparatus as claimed in claim 4 or 5, wherein the control unit is provided with an auxiliary angle processing means constituted by said angle processing means, and a main angle processing means for detecting said rotation angle $\theta$, and controlling said motor on the basis of said rotation angle signal output by said auxiliary angle processing means in place of said rotation angle $\theta$ detected by said main angle processing means in the case that said main angle processing means is out of order.

7. The control unit for electric power steering apparatus as claimed in claim 6, wherein a current applied to said motor is constituted by a sine-wave current in the case of being controlled on the basis of said rotation angle $\theta$, and a current applied to said motor is constituted by a rectangular current in the case of being controlled on the basis of said rotation angle signal.

* * * * *